(12) United States Patent
Cao et al.

(10) Patent No.: US 9,846,409 B2
(45) Date of Patent: Dec. 19, 2017

(54) PROCESSING CARTRIDGE AND DRIVING ASSEMBLY THEREOF

(71) Applicant: APEX TECHNOLOGY CO.,LTD., Zhuhai (CN)

(72) Inventors: Jianxin Cao, Zhuhai (CN); Haidong Hua, Zhuhai (CN); Qijie Liang, Zhuhai (CN)

(73) Assignee: APEX TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/342,916

(22) Filed: Nov. 3, 2016

(65) Prior Publication Data
US 2017/0075300 A1    Mar. 16, 2017

Related U.S. Application Data

(63) Continuation of application No. PCT/CN2015/078260, filed on May 5, 2015.

(30) Foreign Application Priority Data

May 6, 2014 (CN) ............................ 2014-10188674
Jul. 7, 2014 (CN) ............................ 2014-10321331
Jul. 5, 2016 (CN) ............................ 2016-10522242

(51) Int. Cl.
*G03G 21/18*    (2006.01)
*F16D 1/10*    (2006.01)

(52) U.S. Cl.
CPC ............ *G03G 21/1857* (2013.01); *F16D 1/10* (2013.01)

(58) Field of Classification Search
CPC ............. G03G 21/1857; G03G 21/186; G03G 21/1864; F16D 1/10; F16D 3/00
See application file for complete search history.

(56) References Cited

U.S. PATENT DOCUMENTS

2010/0221036 A1*  9/2010 Hara ............... G03G 21/1853
                                                        399/110
2012/0243905 A1*  9/2012 Uratani ............. G03G 21/186
                                                        399/111

FOREIGN PATENT DOCUMENTS

CN    101568887 A    10/2009
CN    101819400 A     9/2010
(Continued)

OTHER PUBLICATIONS

The World Intellectual Property Organization (WIPO) International Search Report for PCT/CN2015/078260 Aug. 12, 2015 pp. 1-8.

*Primary Examiner* — Erika J Villaluna
(74) *Attorney, Agent, or Firm* — Anova Law Group PLLC

(57) ABSTRACT

A driving assembly is provided for a processing cartridge capable of being detachably installed in an electronic imaging device. The driving assembly includes a power receiving unit and a power transfer unit. The power receiving unit is configured for receiving a rotational driving force from a driving mechanism of the electronic imaging device; and the power transfer unit is coupled to the power receiving unit for receiving the rotational driving force from the power receiving unit. The power receiving unit remains constantly inclined with respect to a rotation axis of the power transfer unit, and has an initial position and a displaced position; the power receiving unit moves from the initial position to the displaced position when an external force is applied; and the receiving unit returns to the initial position from the displaced position when the external force is withdrawn.

18 Claims, 30 Drawing Sheets

(56) References Cited

FOREIGN PATENT DOCUMENTS

| | | | |
|---|---|---|---|
| CN | 103376683 | A | 10/2013 |
| CN | 203573085 | U | 4/2014 |
| CN | 204009372 | U | 12/2014 |
| JP | 2004045603 | | 2/2004 |

* cited by examiner

PROCESSING CARTRIDGE AND DRIVING ASSEMBLY THEREOF

CROSS-REFERENCES TO RELATED APPLICATIONS

This application claims priority of Chinese Application No. 201610522242.6, filed on Jul. 5, 2016, and of International Patent Application No. PCT/CN2015/078260, filed on May 5, 2015, which claims priority of Chinese Application No. 201410188674.9, filed on May 6, 2014, and Chinese Application No. 201410321331.5, filed on Jul. 7, 2014, and the entire contents of all of above applications are hereby incorporated by reference.

FIELD OF THE INVENTION

The present disclosure generally relates to the field of printing technologies and, more particularly, relates to a processing cartridge and its driving assembly.

BACKGROUND

Currently, a processing cartridge can be detachably installed in an electronic imaging device. The electronic imaging device is provided with a driving unit to output a rotational driving force. The processing cartridge generally comprises a rotational-force driving assembly, a developing unit, toner, a toner control unit, and a body for containing these units. In addition, based on different types of the processing cartridge structures, the processing cartridge can also include a photosensitive unit, a charging unit, a cleaning unit, and a stirring unit, etc. The rotational-force driving assembly of the processing cartridge is disposed at one side of the processing cartridge along an axial direction of the developing unit, and engages with the driving unit of the electronic imaging device to input the rotational driving force into the processing cartridge, which drives the rotatable units (e.g., the developing unit, the photosensitive unit, the stirring unit) inside the processing cartridge to rotate and to participate the developing process of the electronic imaging device.

Before the electronic imaging device can perform the developing operation (i.e., generally called "printing"), a user needs to install the processing cartridge into the electronic imaging device, the driving assembly of the processing cartridge make contact with the driving unit of the electronic imaging device to engage with each other.

As shown in FIGS. 1 and 2, an electronic imaging device (not shown) has a driving unit 500, which contacts and engages with the driving assembly 100 located at one end of the processing cartridge C. During installation of the processing cartridge, the driving assembly 100 moves towards the driving unit 500 along the installation direction Y1 (the installation direction Y1 is approximately perpendicular to the rotation axis direction of the rotational shaft L3 of the developing unit 10). When moving to a coaxial position with the driving unit 500, the driving pin 510 of the driving unit 500 engages the driving gear 110 of the driving assembly 100 to transfer the rotational driving force to the driving assembly 100, and the driving assembly 100 transfers the driving force to various units of the processing cartridge through a set of gears.

As shown in FIG. 3, before the driving assembly 100 contacts and engages the driving unit 500, when the processing cartridge is installed in the electronic imaging device, because the two ends of the processing cartridge is relatively fixed by the inner wall or guiding rails of the electronic imaging device, the processing cartridge cannot move in the axial direction. Similarly, the driving unit 500 inside the electronic imaging device often only rotates along its own axis and cannot shift. Thus, before the driving assembly 100 contacts and engages the driving unit 500, because there is a height difference H1 between the lowest point of the driving pin 510 and the highest point of the engaging gear 110, there is a possibility that the engaging gear 110 and the driving pin 510 may structurally interfere with each other during the engagement.

To reduce the structural wear or interference, the outer surface of the driving pin 510 or the engaging gear is generally configured as a tilted surface or a smooth and round surface and, at the same time, when the driving assembly 100 contacts the driving unit 500, the engaging gear can retreat along the rotation axis direction of the driving assembly 100 to avoid the structural interference.

Thus, as the drive unit 500 and the power receiving unit 100 is present between the two times of repeated engagement and disengagement of the action, it is easy to cause the electronic imaging device, the structure of the drive unit 500 or the processing cartridge C of the power receiving unit 100 is worn or broken, the drive unit 500 and the power receiving unit 100 is difficult or impossible to stably engage each other and transmit power. In this way, the electronic imaging device or the processing cartridge C and thus cannot continue normal use, the subsequent development quality is also affected to a different degree.

The disclosed processing cartridges and methods are directed to solve one or more problems set forth above and other problems.

BRIEF SUMMARY OF THE DISCLOSURE

One aspect of the present disclosure includes a driving assembly of a processing cartridge capable of being detachably installed in an electronic imaging device. The driving assembly includes a power receiving unit and a power transfer unit. The power receiving unit is configured for receiving a rotational driving force from a driving mechanism of the electronic imaging device; and the power transfer unit is coupled to the power receiving unit for receiving the rotational driving force from the power receiving unit. The power receiving unit remains constantly inclined with respect to a rotation axis of the power transfer unit, and has an initial position and a displaced position; the power receiving unit moves from the initial position to the displaced position when an external force is applied; and the receiving unit returns to the initial position from the displaced position when the external force is withdrawn.

Another aspect of the present disclosure includes a processing cartridge capable of being detachably installed in an electronic imaging device. The processing cartridge includes a developing unit and a driving assembly. The driving assembly includes a power receiving unit for receiving a rotational driving force from a driving mechanism of the electronic imaging device, and a power transfer unit coupled to the power receiving unit for receiving the rotational driving force from the power receiving unit. The power receiving unit remains constantly inclined with respect to a rotation axis of the power transfer unit, and has an initial position and a displaced position. The power receiving unit moves from the initial position to the displaced position when an external force is applied; the receiving unit returns to the initial position from the displaced position when the external force is withdrawn. The power receiving unit has an engaging portion; and a first position of the engaging portion when the receiving unit is in the initial position is closer to the developing unit than a second position of the engaging portion when the receiving unit is in the displaced position, Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined in different ways as long as such combination does not incur any conflict.

As illustrated in the present disclosure, an axial direction of a processing cartridge may be coaxial with or parallel to the rotation axis of the developing unit or the power transfer unit. The installation direction of the processing cartridge into the electronic imaging device may be substantially perpendicular to the axial direction of the processing cartridge. Further, the uninstallation (taken out) direction of the processing cartridge from the electronic imaging device may be opposite to the installation direction of the processing cartridge.

Figure 1:
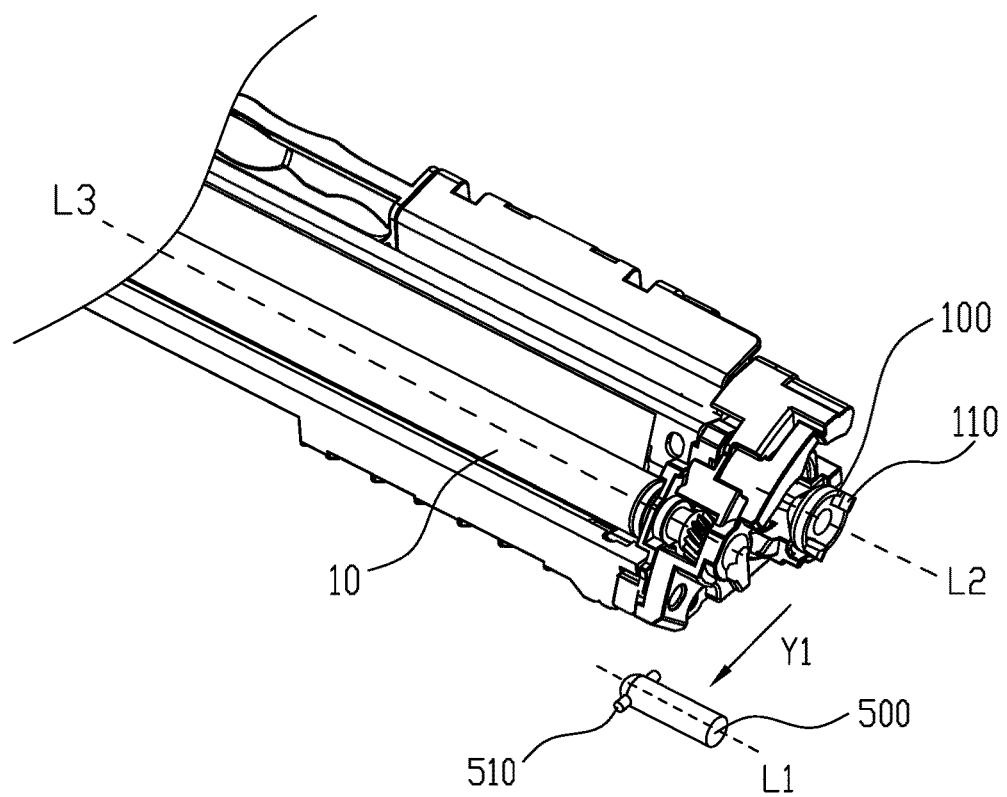
FIGS. 1 and 2 are schematic diagrams of the driving assembly of an existing processing cartridge and the driving mechanism of an electronic imaging device.
Figure 2:
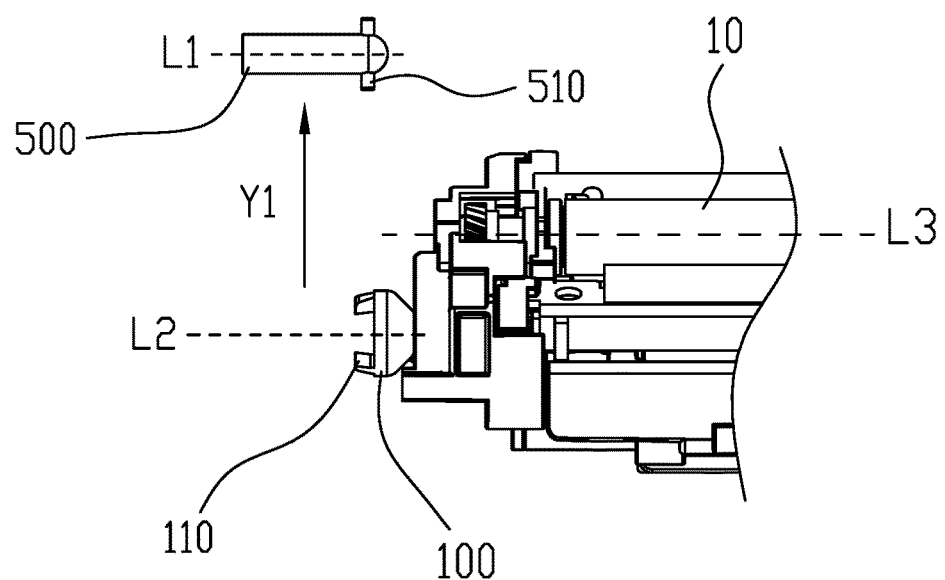
Figure 3:
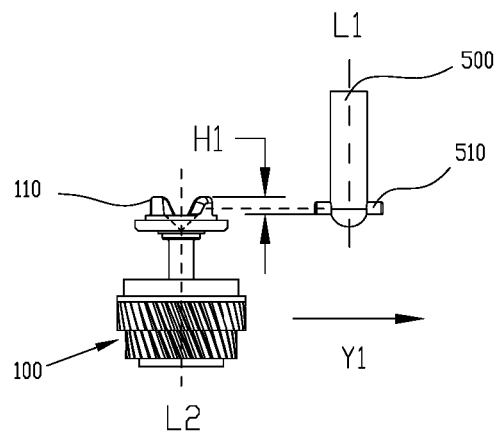
FIG. 3 is a schematic diagram of an existing driving assembly prior to engaging with the drive mechanism.
Figure 4:
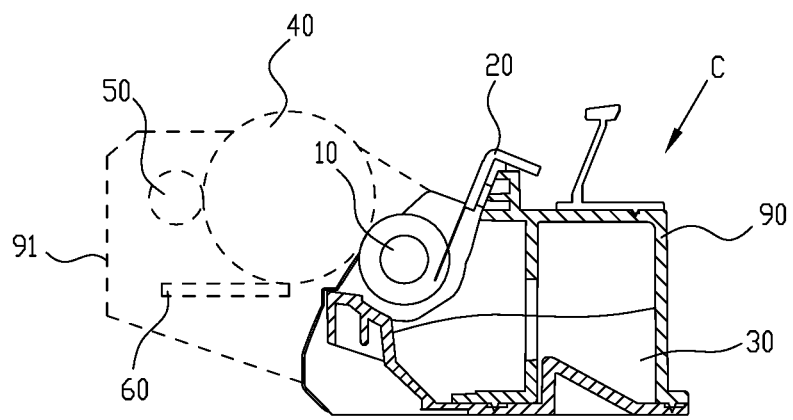
FIG. 4 illustrates a sectional structural diagram of an exemplary processing cartridge consistent with disclosed embodiments.
Figure 5:
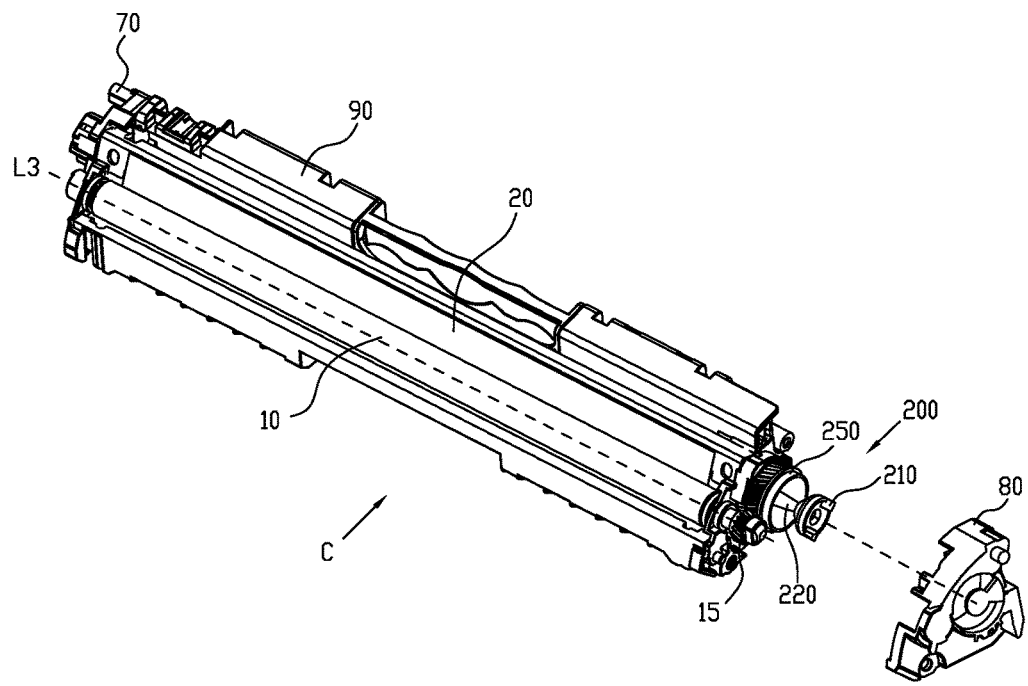
FIG. 5 illustrates a structural diagram of an exemplary processing cartridge consistent with disclosed embodiments.

FIGS. 4 and 5 illustrate an exemplary processing cartridge. As shown in FIGS. 4 and 5, a processing cartridge C includes a housing 90. The housing 90 may be configured to store a developing agent 30, a toner control unit 20 is fixedly disposed on the surface of the housing 90. Further, a developing unit 10 is rotatably installed on the housing 90. The driving assembly 200 is located at one side of the processing cartridge C and is installed on the housing 90 through a baffle 80.

In addition, in certain processing cartridge C, a housing 91 and an internal cleaning unit 60, a photosensitive unit 40, and a charging unit 50 may also be provided.

The driving assembly 200 may be located at one end of the processing cartridge C and may include a power receiving unit 200a and a power transfer unit 250. The power receiving unit 200a receives the driving force from the driving mechanism in the electronic imaging device and transfers the rotational driving force to the power transfer unit 250.

The power receiving unit 200a may be constantly inclined with respect to the rotation axis of the power transfer unit 250, and has an initial position and a displaced position. The power receiving unit 200a may switch between the initial position and the displaced position. Specifically, under external force, such as force generated when uninstalling the processing cartridge C, the power receiving unit 200a can move from the initial position to the displaced position.

When the external force is withdrawn and the processing cartridge C is in the installation position, for example, the power receiving unit 200a returns to the initial position from the displaced position by an internal force. The structural wear and tear caused by structural interference of the driving assembly and the driving mechanism of the prior art may be reduced. Thus, the service life of the processing cartridge and the electronic imaging device can be extended.

In order for the power receiving unit 200a to move steadily and to make the dislocation position more controllable, the inclination angle between the power receiving unit 200a and the rotation axis of the power transfer unit 250 at the initial position is consistent with the inclination angle between the power receiving unit 200a and the rotation axis of the power transfer unit 250 at the displaced position. To achieve this effect, in the present invention, a position-limiter portion may be provided.

For the power receiving unit 200a to automatically return to its initial position, a reset member may be provided. In some embodiments, the driving assembly may also include a baffle, on which the position-limiter portion and the reset member may be installed. Alternatively, the position-limiter portion and/or the reset member may be a part of the baffle.

Embodiment One

Figure 6:
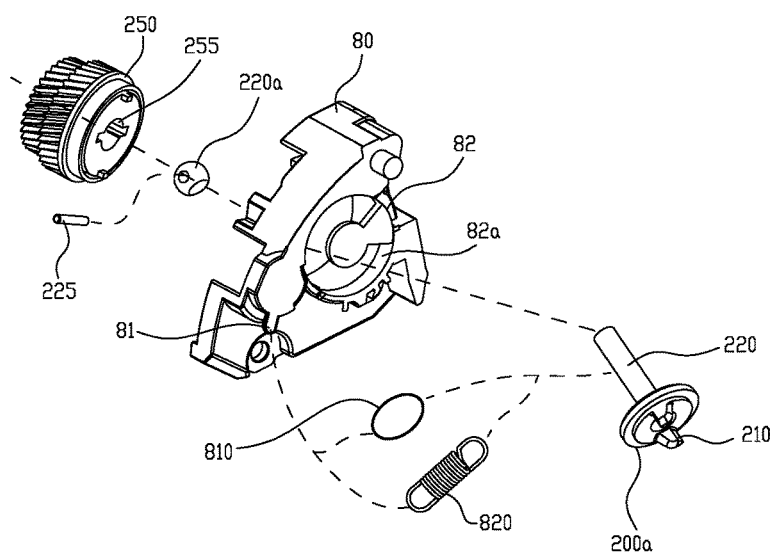
FIG. 6 illustrates a structural diagram of an exemplary driving assembly of the processing cartridge consistent with disclosed embodiments.
Figure 7:
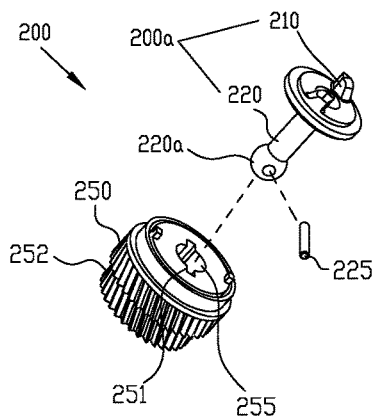
FIG. 7 illustrates a structural diagram of a power receiving unit and a power transfer unit of the driving assembly consistent with disclosed embodiments.

FIGS. 6 and 7 illustrate an exemplary driving assembly. As shown in FIGS. 6 and 7, the driving assembly 200 is located at one end of the processing cartridge C and includes a power receiving unit 200a, a power transfer unit 250, a baffle 80 coupled with the power receiving unit 200a and the power transfer unit 250, and a reset member 810 (e.g., a rubber band or a tensile spring). Other components may also be included.

The power receiving unit 200a includes an engaging portion 210 and a connecting member 220. One end of the connecting member 220 is connected to the engaging portion 210. The other end of the connecting member 220 is provided with a detachable spherical member 220a and a transferring member 225 is interposed in the spherical member 220a.

The engaging portion 210 includes a pair of engagement claws projecting outwardly. The power transfer unit 250 is provided with a transmission gear 252 on the outer surface, and a cavity 255 and a chute 251 in the middle. The connecting member 220 of the power receiving unit 200a is placed in the cavity 255 of the power transfer unit 250 at one end; the transferring member 225 is placed in the chute 251. When the power receiving unit 200a receives a driving force, the transferring member 225 in contact with the chute 251, transfers the driving force to the power transfer unit 250.

Figure 7A:
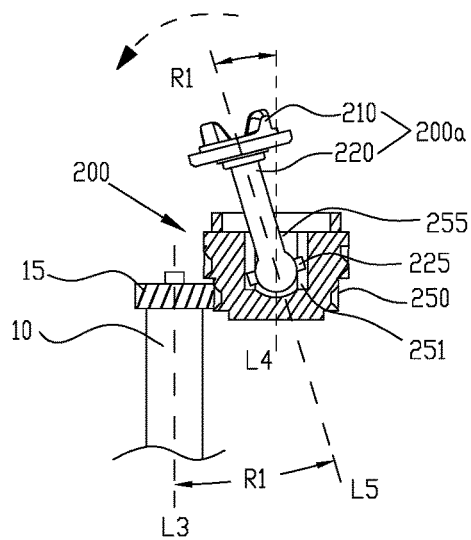
FIGS. 7A and 7B illustrates schematic diagrams illustrating the inclination of the power receiving unit to the power transfer unit consistent with disclosed embodiments.
Figure 7B:
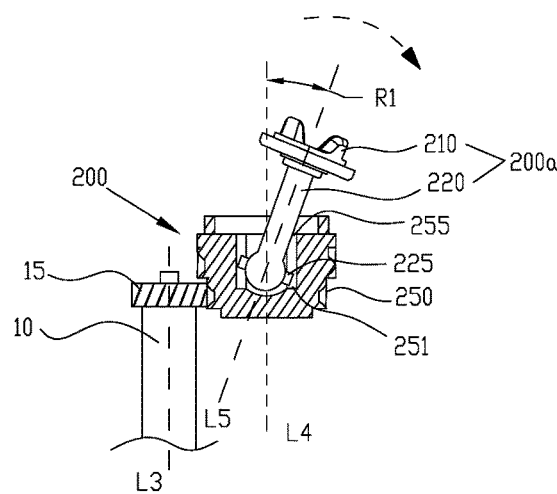

As shown in FIGS. 7A and 7B, after the power receiving unit 200a is assembled with the power transfer unit 250, the power receiving unit 200a can rotate along the rotation axis L4 of the power transfer unit 250 for an angular displacement of 360 degrees, and swing obliquely to the power transfer unit 250. In other words, the rotation axis L5 of the power receiving unit 200a may have in inclination angle R1 with respect to the rotation axis L3 of the developing unit 10 or the rotation axis L4 of the power transfer unit 250.

Because the transferring member 225 is located in the chute 251, the power receiving unit 200a can transfer the receiving driving force to the power transfer unit 250 even when the power receiving unit 200a is in an inclined state. The power transfer unit 250 can then transfer the driving force to the developing unit 10 via engaging the gear 15 on end of the developing unit 10 by the transmission gear 252.

Figure 8A:
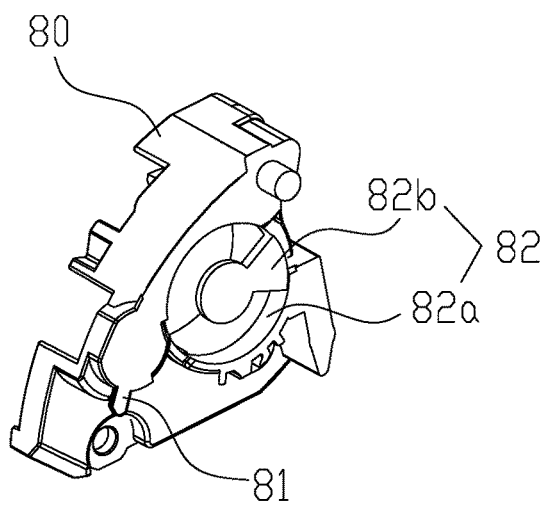
FIGS. 8A and 8B illustrate structural diagrams of a position-limiter portion of the baffle consistent with disclosed embodiments.
Figure 8B:
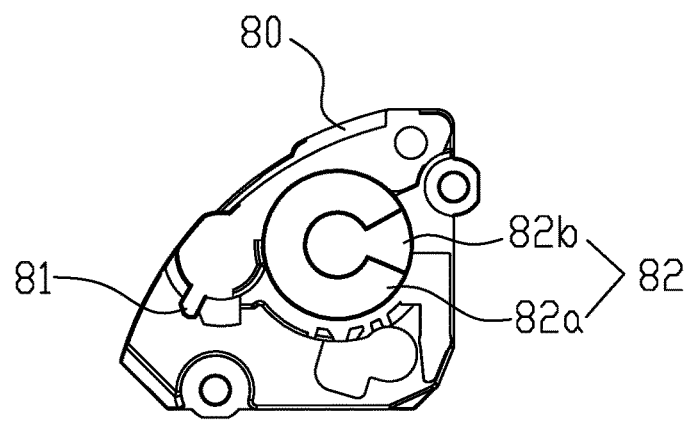

As shown in FIGS. 8A and 8B, the baffle 80 may include a protrusion 81, a position-limiter portion 82. The position-limiter portion 82 is configured with an arc-shaped chute 82a and a position-limiter 82b coupled with the arc-shaped chute 82a.

In certain embodiments, the various components may be assembled in certain ways. For example, as shown in FIG. 6, the connecting member 220 of the power receiving unit 200a is connected to the spherical member 220a passing through the arc-shaped chute 82a of the baffle 80. After inserted into the spherical body 220a, the transferring member 225 is located together with the spherical body 220a in the cavity 255 of the power transfer unit 250. The reset member 810 is attached to the protrusion 81 of the baffle 80 on one side and is attached to the connecting member 220 on the other side.

Figure 9:
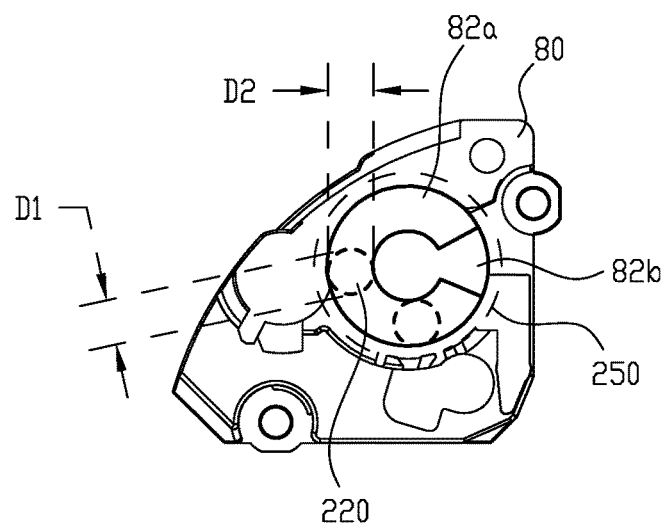
FIG. 9 illustrates is a structural diagram of a position-limiter portion of the baffle in the processing cartridge consistent with disclosed embodiments.
Figure 10A:
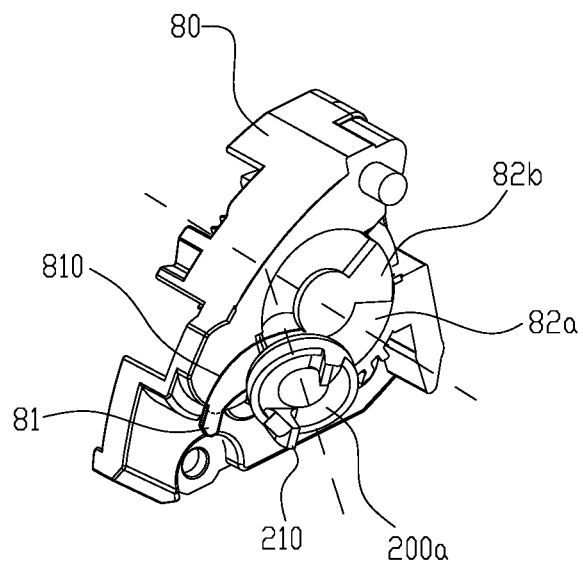
FIGS. 10A, 10B, 11A, and 11B illustrate schematic diagrams of the power receiving unit coupling with the reset member consistent with disclosed embodiments.
Figure 10B:
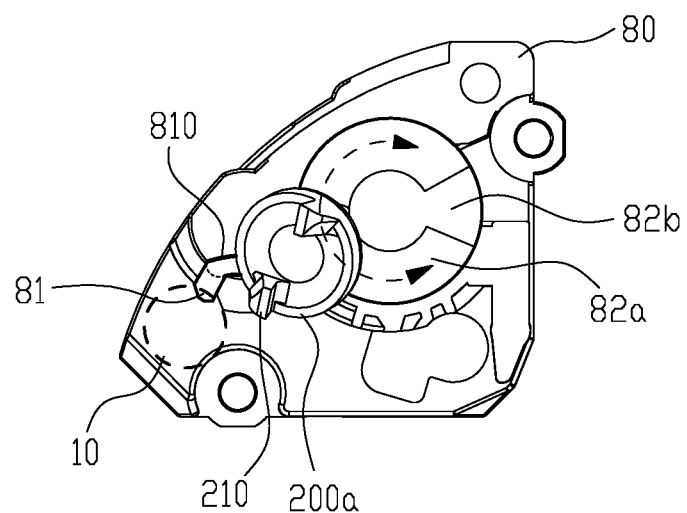
Figure 11A:
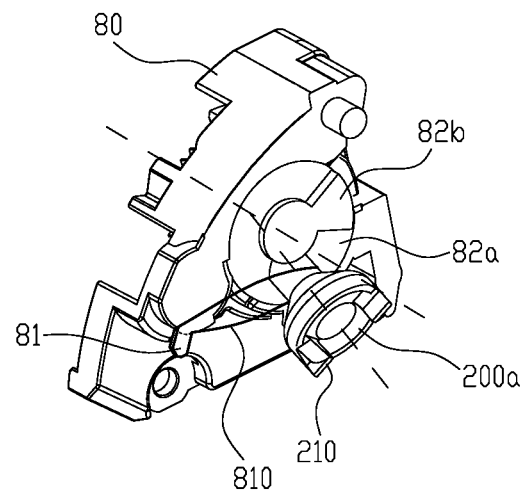
Figure 11B:
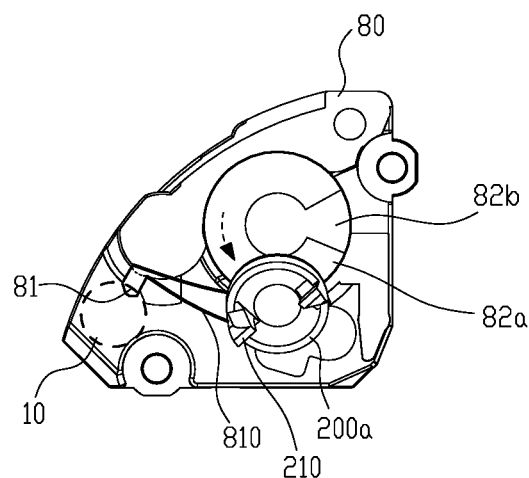
Figure 12:
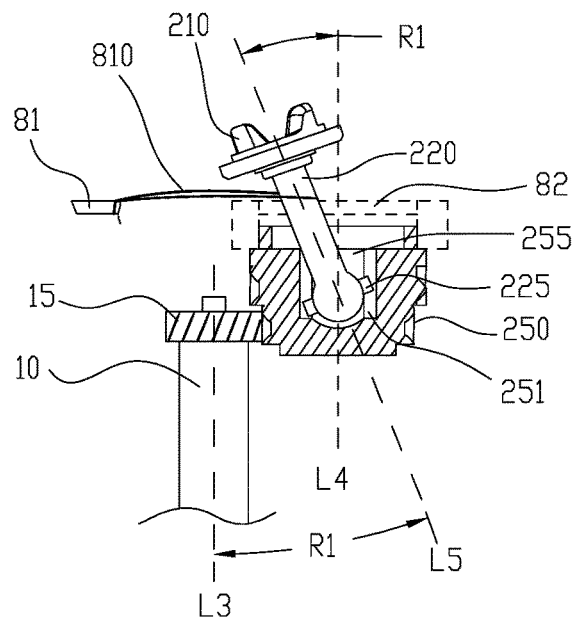
FIG. 12 illustrates another schematic diagram of the power receiving unit and coupling with the reset member with disclosed embodiments.

As shown in FIG. 9, after assembling the above-mentioned components, when an external force is applied to the power receiving unit 200a, the connecting member 220 of the power receiving unit 200a moves or slides in the arc-shaped chute 82a along the track. Viewed in the axial direction, the arc-shaped chute 82a is disposed around the rotation axis of the power transfer unit 250 and the position of the position-limiter 82b overlaps with the rotation axis of the power transfer unit 250, causing the power receiving unit 200a to swing.

At the same time, under the restriction of the arc-shaped chute 82a and the position-limiter 82b of position-limiter portion 82, power receiving unit 200a remains inclined with respect to the power transfer unit 250, as shown in FIG. 7A. That is, the rotation axis L5 of the power receiving unit 200a is constantly inclined with respect to the rotation axis L4 of the power transfer unit 250 or the rotation axis L3 of the developing unit 10, and is not coaxial with the rotation axis L4 or parallel to the rotation axis L3.

Further, to limit the change of the inclination angle between the power receiving unit 200a and the power transfer unit 250, the width D2 of the arc-shaped chute 82a of the position-limiter portion 82 is substantially the same as the diameter D1 of the connecting member 220 of the power receiving unit 200a. As such, when the connecting member 220 slides in the arc-shaped chute 82a, the inclination angle R1 between the rotation axis L5 of the power receiving unit 200a and the rotation axis L4 of the power transfer unit 250 may remain the same.

When the elastic force pulling the connecting member 220 toward the protrusion 81 is applied through the reset member 810, and no external force is applied to the engaging portion 210, the engaging portion 210 is in the initial position without the external force. When an external force drives the connecting member 220 of the engaging portion 210 to slide along the arc-shaped chute 82a, the engaging portion 210 is in the displaced position under the external force.

Figure 13:
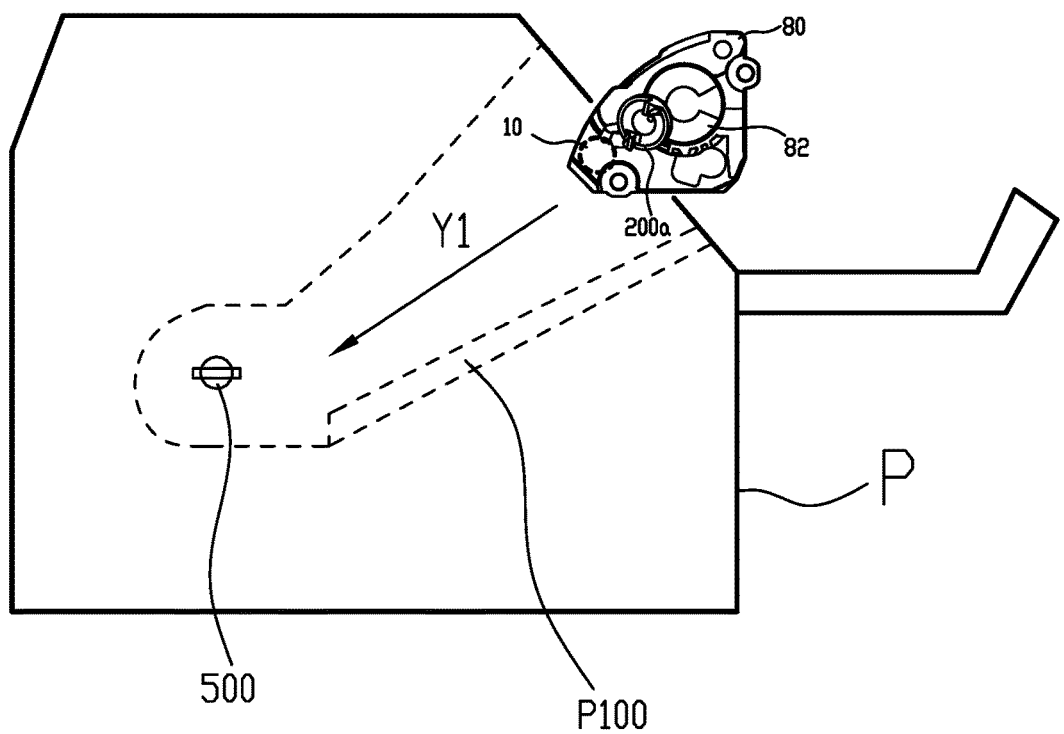
FIG. 13 illustrates a schematic diagram of the processing cartridge inserted into the electronic imaging device consistent with disclosed embodiments.

As shown in FIGS. 10A to 11B, comparing the initial position with the displaced position, when in the initial position, under the elastic tension of the reset member 810, the engaging portion 210 is located closer to the developing unit 10 in the initial position than in the displaced position. Likewise, as shown in FIG. 13, when the processing cartridge is installed in the installation direction Y1 along the rail P100 of the electronic imaging device P, the engaging portion 210 in the initial position is closer to the front than the engaging portion 210 in the displaced position, relative to the installation direction Y1 of the processing cartridge. Accordingly, when the engaging portion 210 is in the initial position, it is easier for the engaging portion 210 to contact and engagement with the driving mechanism 500 of the electronic imaging device P to receive the rotational driving force.

Embodiment Two

Figure 14:
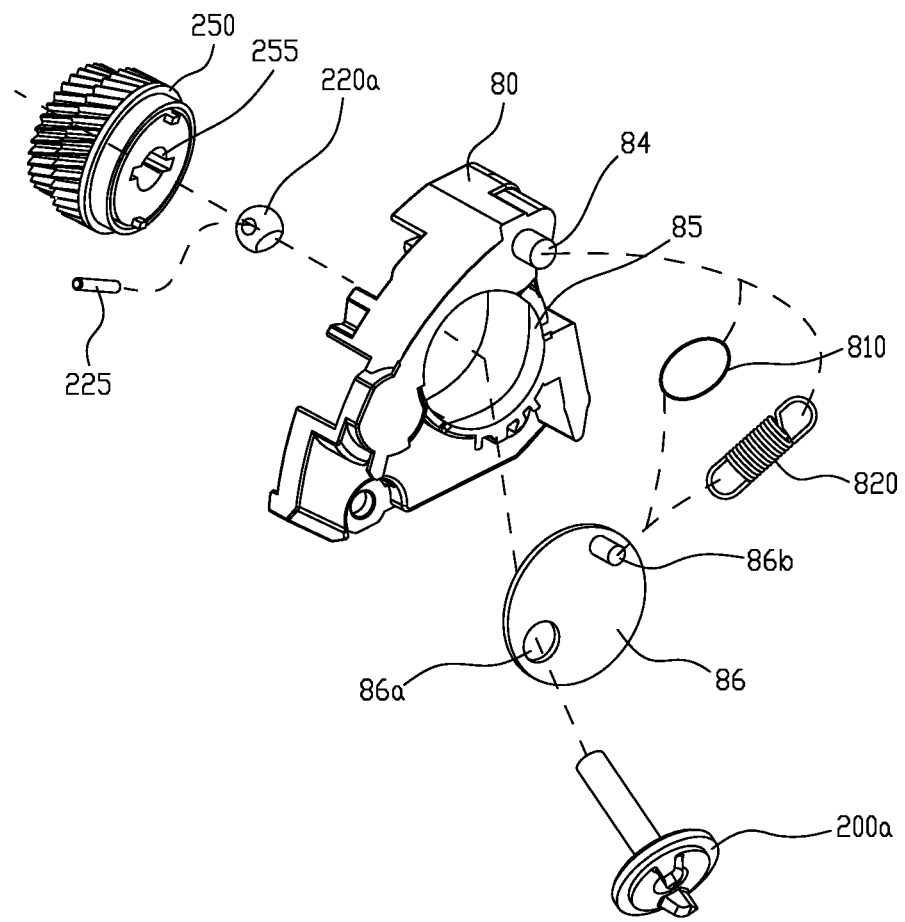
FIG. 14 illustrates a structural diagram of the driving assembly of another exemplary processing cartridge consistent with disclosed embodiments.
Figure 15A:
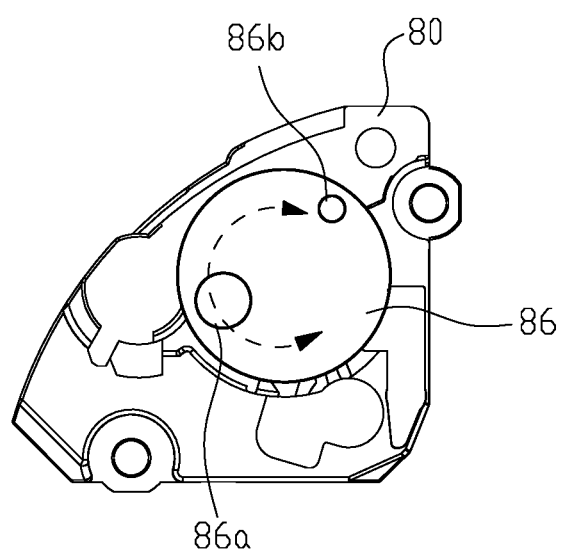
FIGS. 15A and 15B illustrate structural diagrams of the position-limiter portion of the baffle in the processing cartridge consistent with disclosed embodiments.
Figure 15B:
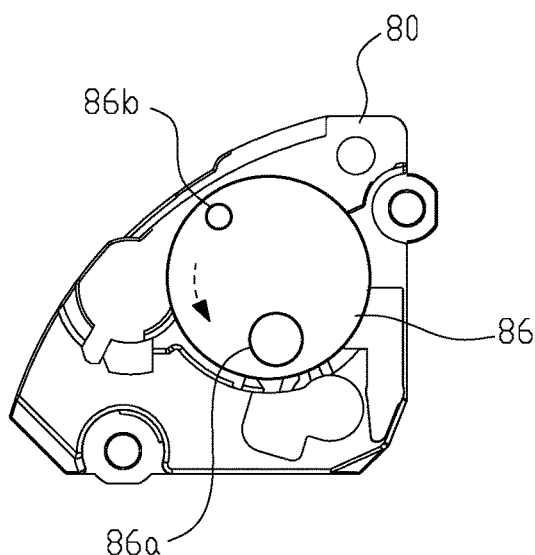
Figure 16:
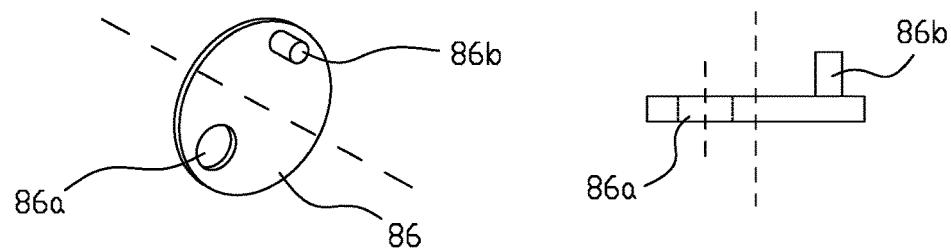
FIG. 16 illustrates a structural diagram of the position-limiter portion of the baffle consistent with disclosed embodiments.
Figure 17A:
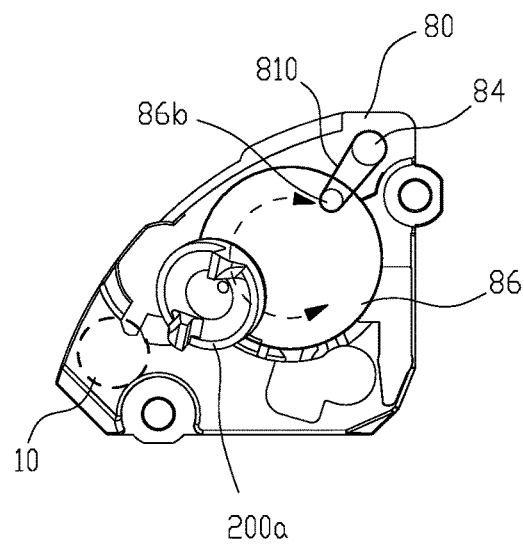
FIGS. 17A, 17B, 18A and 18B illustrate schematic diagrams of the power receiving unit coupling with the reset member consistent with disclosed embodiments.
Figure 17B:
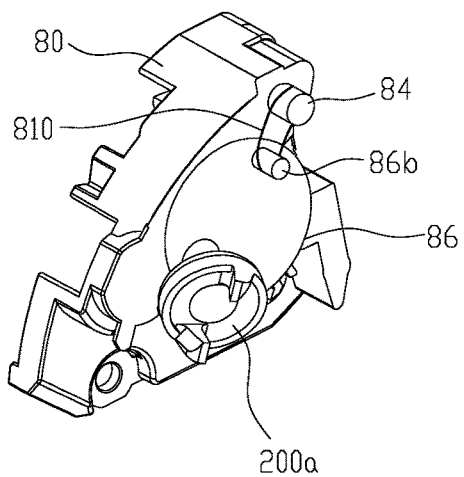
Figure 18A:
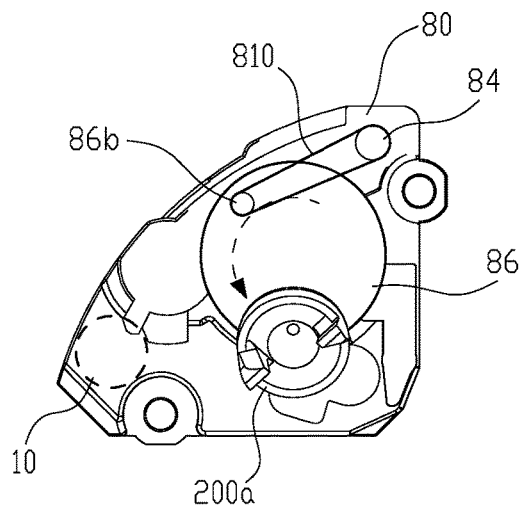
Figure 18B:
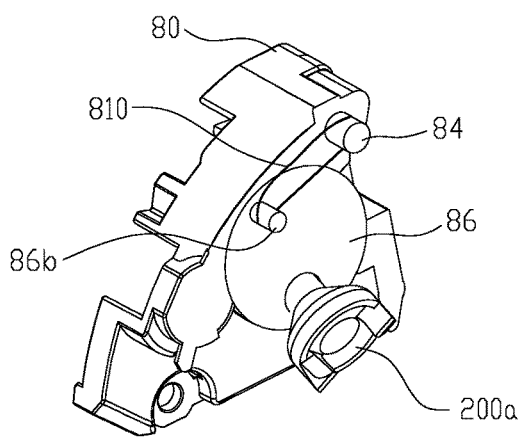

To avoid repeating descriptions of same or similar components, descriptions of those already described components may be omitted, such as the power receiving unit 220a, the power transfer unit 250 and the reset member 810, etc., and differences between embodiments may be explained in detail. FIGS. 14-16 illustrate another exemplary processing cartridge.

As shown from FIGS. 14 to 16, the baffle 80 includes an opening 85, a projection 84, and a position-limiter portion 86 covering the opening 85. The position-limiter portion 86 is a disc-shaped structure with a through-hole 86a and a protrusion or shaft 86b. The through-hole 86a and the shaft 86b are located away from the rotation axis of the position-limiter portion 86, and the diameter of the through-hole 86a is substantially the same as the diameter of the connecting member 220 of the power receiving unit 200a.

In certain embodiments, the various components may be assembled in certain ways. For example, the position-limiter portion 86 may cover the opening 85 and is rotatable along the rotation axis of the power transfer unit 250. The connecting member 220 of the power receiving unit 200a is connected to the spherical member 220a passing through the through-hole 86a, the transferring member 225 is inserted into the spherical member 220a and then together placed in the cavity 255 of the power transfer unit 250. One end of the reset member 810 loops the protrusion or shaft 86b of the position-limiter portion 86 and the other end of the reset member 810 loops the projection 84 of the baffle 80.

As shown in FIGS. 17A, 17B, 18A, and 18B, the engaging portion 210 of the power receiving unit 200a has an initial position where no external force is applied and a displaced position when an external force is applied. When no external force is applied, the engaging portion 210 stays in the initial position under elastic tension of the reset member 810, which pulls the protrusion 86b and the projection 84 closer to each other. The position-limiter portion may control the power receiving unit 200a to move between the initial position and the displaced position by, for example, causing the power receiving unit to maintain a same inclination angle with respect to the power transfer unit when the power receiving unit is in the initial position and in the displaced position.

Figure 19:
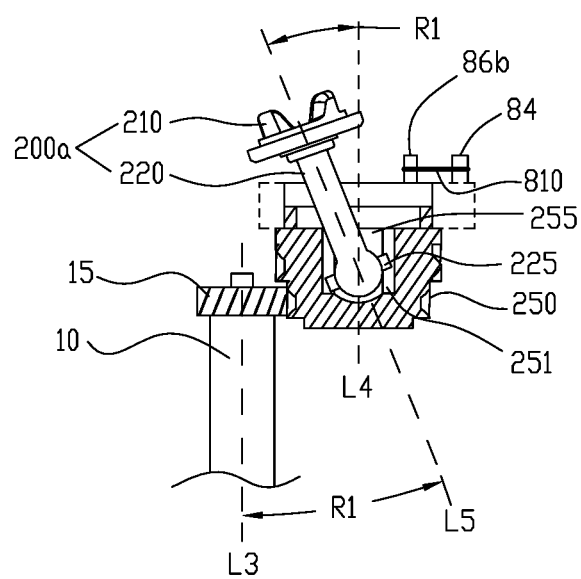
FIGS. 19 and 20 illustrate schematic diagrams of the power receiving unit coupling with the reset member to cause the power receiving unit to tilt consistent with disclosed embodiments.

When the external force is applied, the engaging portion 210 is pushed by the external force such that the connecting member 220 is displaced and the position-limiter portion 86 starts rotating. Because the through-hole 86a of the position-limiter portion 86 is located away from the rotation axis of the position-limiter portion 86, as shown in FIG. 19, by coupling the through-hole 86a and the connecting member 220, the inclination angle R1 between the rotation axis L5 of the power receiving unit 200a and the rotation axis L4 of the power transfer unit 250 or the rotation axis L3 of the development unit 10 may remain constant.

Further, when the external force applied to the engaging portion 210 is withdrawn, the engaging portion 210 returns from the displaced position to the initial position under the elastic tension force of the reset member 810.

Figure 20:
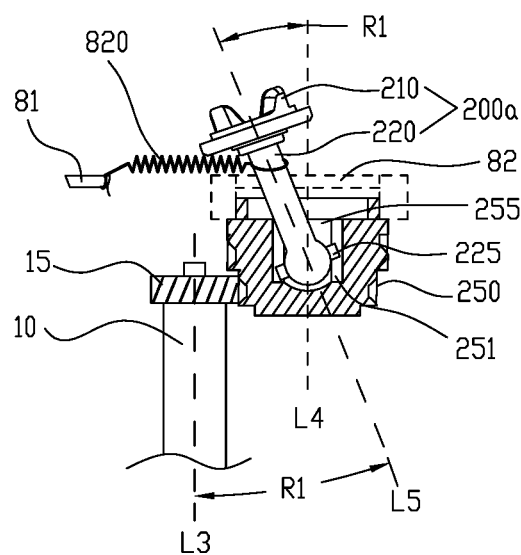

In certain embodiments, as shown in FIGS. 6, 14 and 20, the reset member 810 may be a rubber band or a tensile spring 820.

Figure 21:
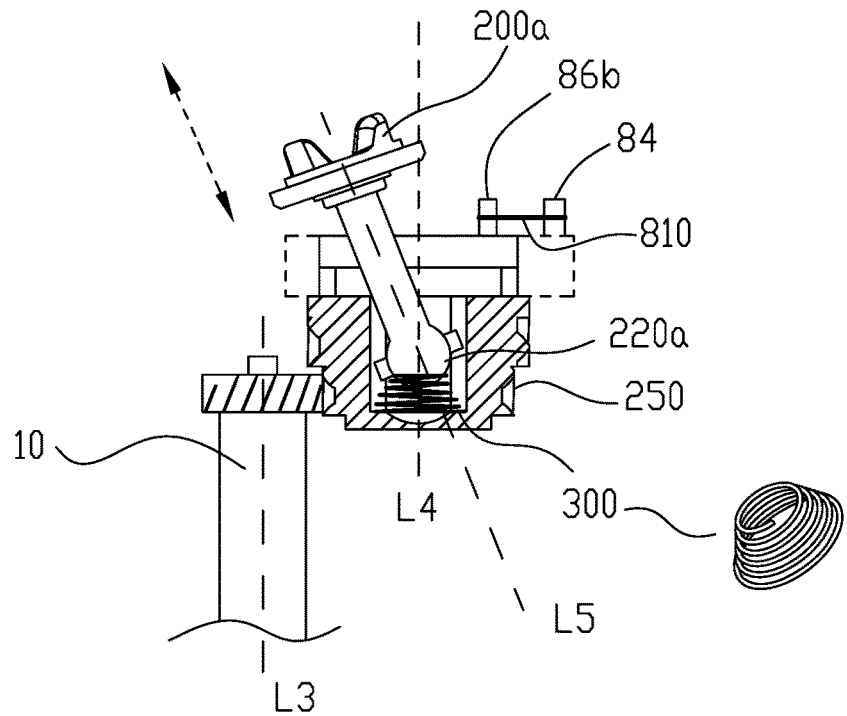
FIG. 21 illustrates a structural diagram of the power receiving unit and the power transfer unit consistent with disclosed embodiments.

In certain embodiments, as shown in FIG. 21, when driven by an external force, to make the engaging portion 210 of the power receiving unit 200a extendable with respect to the transfer unit 250 (i.e., being able to expand and retract along the axis L5), and having buffering effect for reduction of tear and wear, a buffer member 300 may be provided between the power receiving unit 200a and the power transfer unit 250. The buffer member 300 may be a conical spring, a magnet, an elastic sponge, and so forth.

Figure 22:
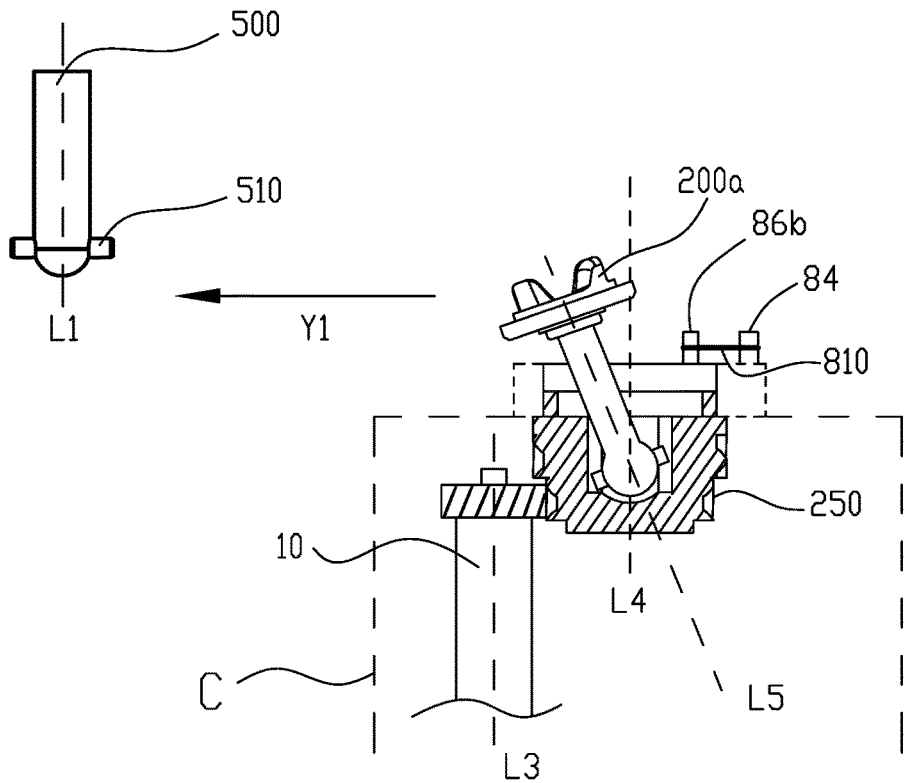
FIGS. 22 and 23 illustrate schematic diagrams illustrating the power receiving unit contacting and engaging with the driving mechanism consistent with disclosed embodiments.
Figure 23:
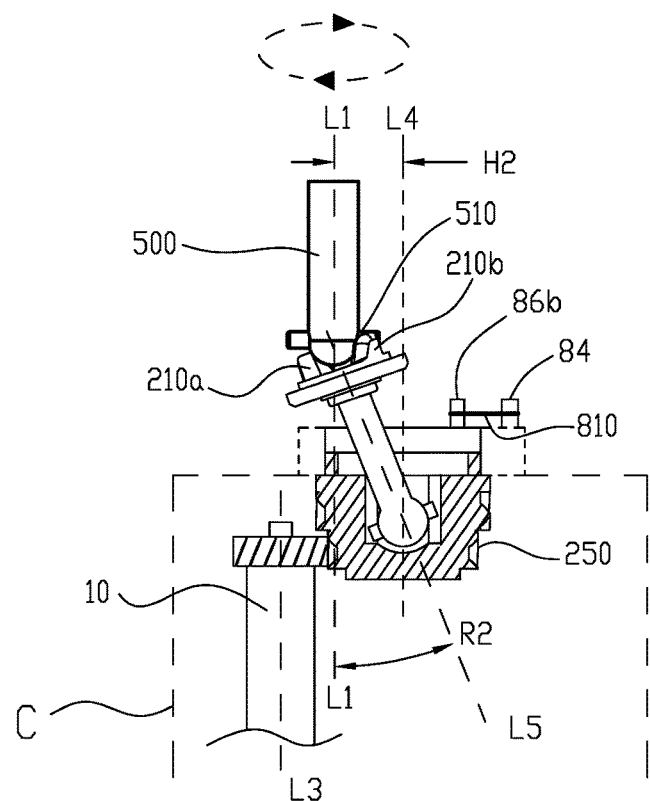

FIGS. 22 and 23 illustrate engagement between the power receiving unit and the driving mechanism. As shown in FIGS. 22 and 23, the power receiving unit 200a of the driving assembly 200 contacts and engages with the driving mechanism 500 of the processing cartridge C in the electronic imaging device P.

Due to the position-limiter portion 82/86, the power receiving unit 200a is constantly inclined with respect to power transfer unit 250. Further, under the effect of the reset member 810/820, the engaging portion 210 in the initial position can avoid the structural interference with the driving pin 510 of the driving mechanism 500. Thus, it may be easy for the engaging portion 210 to enter the center position of the driving mechanism 500. When the power receiving unit 200a engages with driving mechanism for transferring the driving force to the driving mechanism, even when the engaging claws (e.g., 210A, 210B) of the engaging portion 210 are at different levels, one lower and one higher, due to the inclined state, at least one driving pin 510 of the driving mechanism can abut or contact the engaging claw 210B at a higher position to transfer the driving force and to cause rotation of the power receiving unit 200a.

Figure 24:
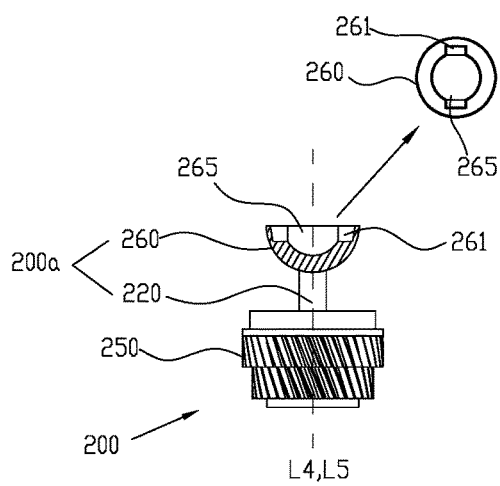
FIGS. 24 and 25 illustrate structural diagrams of another type of engaging portion of the power receiving unit consistent with disclosed embodiments.
Figure 25:
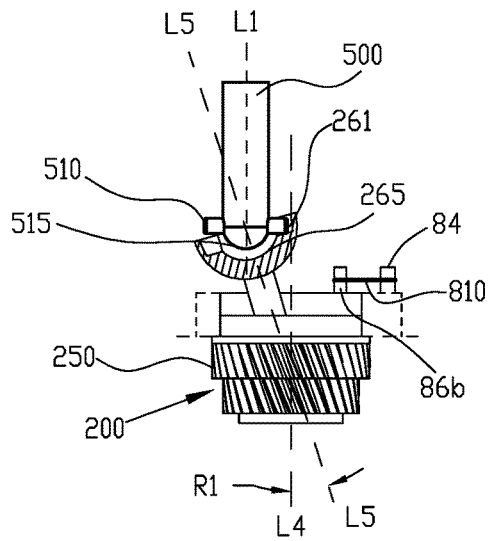

Further, as shown in FIGS. 24 and 25, to ensure that the power receiving unit 200a engages with the driving mechanism 500 to avoid disengagement during the transfer of the driving force, the engagement claws (210A, 210B) of the engaging portion can be replaced with the semispherical member 260 with an inner recess. Like the engaging portion 210, the semispherical member 260 may also be located at one end of the connecting member 220.

The semispherical member 260 has a concave opening 265, and the opening 265 has at least two blocking walls 261. The opening 265 may enclave the arc projection 515 at the front of the driving mechanism 500, and the blocking wall 261 receives the driving force by abutting the driving pin 510 of the driving mechanism.

Likewise, the power receiving unit 200a may also be under the effect of the position-limiter portion, and the power receiving unit 200a may remain inclined to the power transfer unit 250. When the power receiving unit 200a contacts and engages with the driving mechanism 500, with the shape configuration of the semispherical member 260, during transfer of driving force between the driving mechanism 500 and the power receiving unit 200a, the arc-shaped protrusion 515 can be wrapped by the semispherical member 260, and the driving pin 510 is also inside the opening 265 when abutting the blocking wall 261. Accordingly, when the driving mechanism 500 engages with the power receiving unit 200a to transfer the driving force, the driving mechanism 500 can largely avoid disengagement from the power receiving unit 200a.

Figure 26:
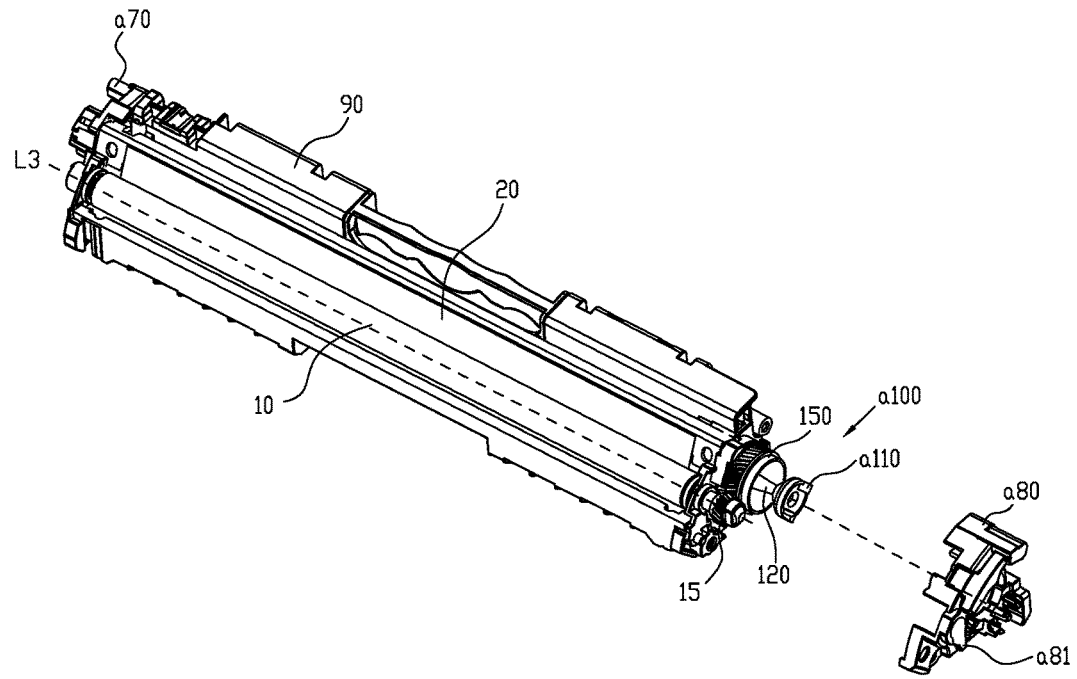
FIG. 26 illustrates a structural diagram of another exemplary processing cartridge consistent with disclosed embodiments.

FIG. 26 illustrates an exemplary processing cartridge C inserted into the electronic imaging device. As shown in FIG. 26, the processing cartridge C may include a housing 90 in which developing agent 30 is stored, and a toner control unit 20 is disposed on the surface of the housing 90. The baffle 80 and another baffle 70 are located at both ends of the housing 90, respectively. The developing unit 10 is rotatably installed on the housing 90 by the baffle 80 and the baffle 70. In general, the driving assembly a100 is located at one end of the processing cartridge C, and the driving assembly a100 is rotatably disposed between the baffle plate a80 and the housing 90.

In order to mitigate or remove the structural interference or the structural wear of the driving pin 510 when moving to engage or disengage with the engaging portion a110, the present disclosure provides an improved assembly structure.

Embodiment Three

Figure 27A:
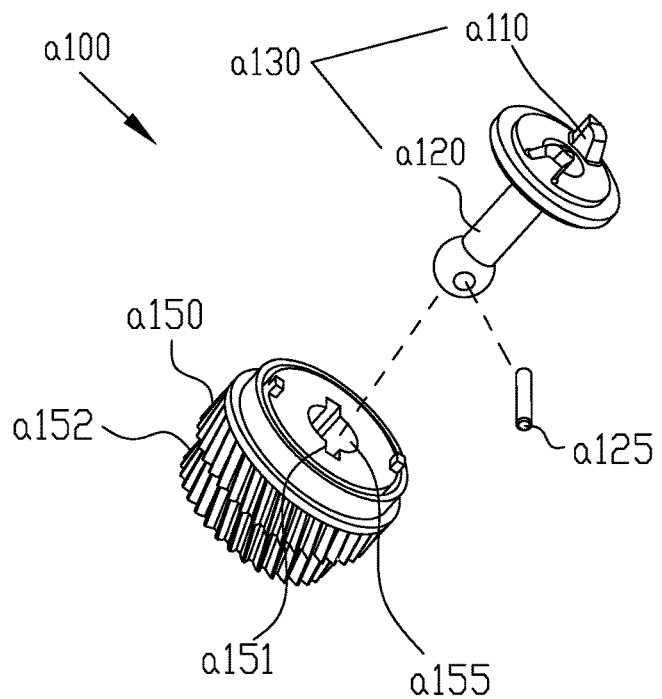
FIGS. 27A and 27B illustrates structural diagrams of an exemplary driving assembly consistent with disclosed embodiments.
Figure 27B:
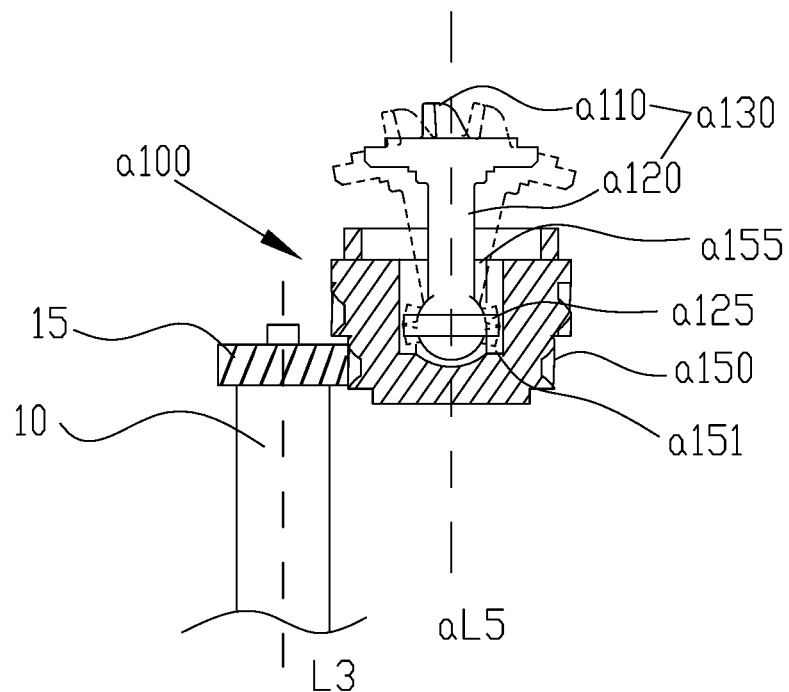
Figure 28:
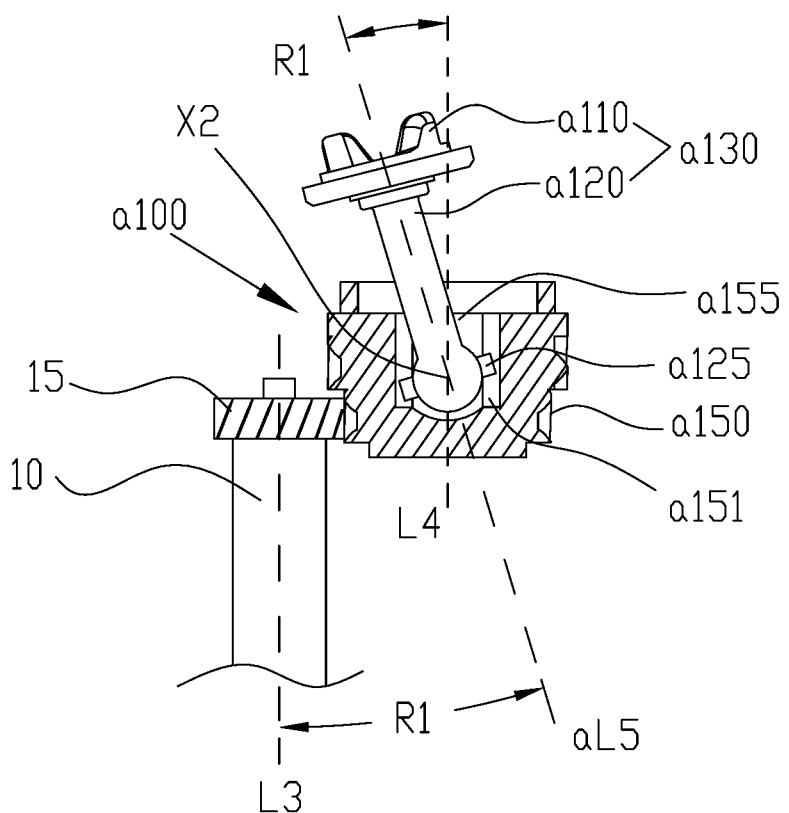
FIG. 28 illustrates a structural diagram of an inclined power receiving unit of the driving assembly consistent with disclosed embodiments.

FIGS. 27A, 27B, and 28 illustrate an exemplary driving assembly in the electronic imaging device. As shown in FIGS. 27A, 27B, and 28, the driving assembly a100 can engage with the developing unit 10 through a gear 15. The driving assembly a100 includes a power receiving unit a130, a power transfer unit a150, and a position-limiter a600. The power receiving unit a130 includes an engaging portion a110 for engaging with the driving pin 510 of the driving mechanism (i.e., the engaging portion thereof is provided with at least two projecting engagement claws), and transferring the rotational driving force to the connecting member a120. One end of the connecting member a120 is connected to the engaging portion a110, and the other end of the connecting member a120 is disposed with the transferring member a125. The power transfer unit a150 is provided with a transmission gear a152 for transferring a driving force, a cavity a155 in the center, and one or more chutes a151 on the side wall of the cavity a155.

In certain embodiments, the various components may be assembled in certain ways. One end of the connecting member a120 (i.e., the end with the transferring member a125) is placed in the cavity a155 of the power transfer unit a150, the transferring member a125 abuts the chute a151 thereof to transfer the driving force, and the driving gear a152 on the surface of the power transfer unit a150 then transfers the driving force to the gear 15 of the developing unit 10, to drive the rotation of the developing unit 10.

As shown in FIGS. 27B and 28, after the power receiving unit a130 is installed to the power transfer unit a150, the power receiving unit a130 can swing toward at least a certain direction in the power transfer unit a150. That is, there is an inclination angle R1 between the center line aL5 of the power receiving unit a130 and the rotation axis of the power transfer unit a150 or the rotation axis L3 of the developing unit 10, and the inclination range of the inclination angle R1 may be approximately between 5 degrees to 50 degrees.

Figure 29A:
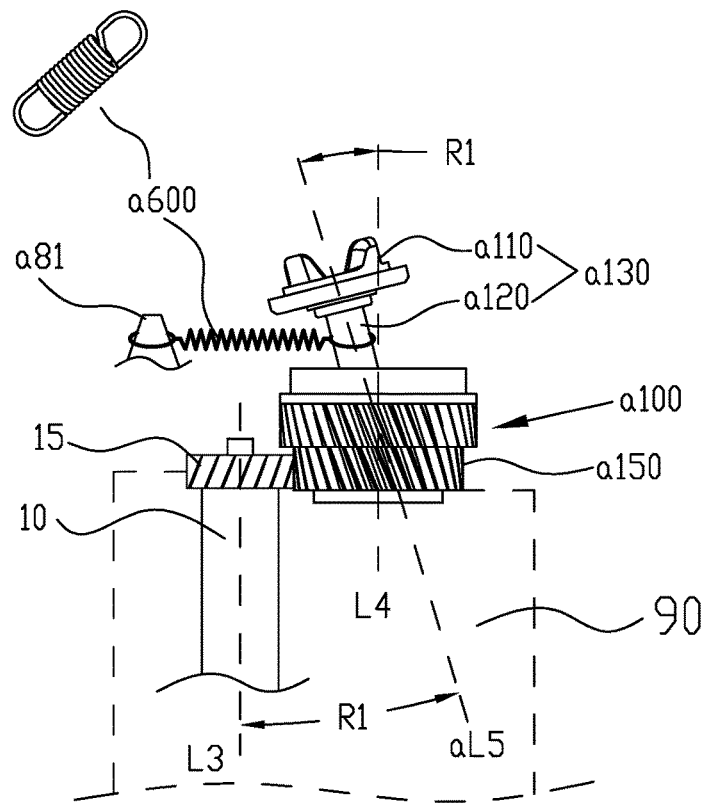
FIG. 29A illustrates a structural diagram of a position-limiter causing the power receiving unit to tilt consistent with disclosed embodiments.
Figure 29B:
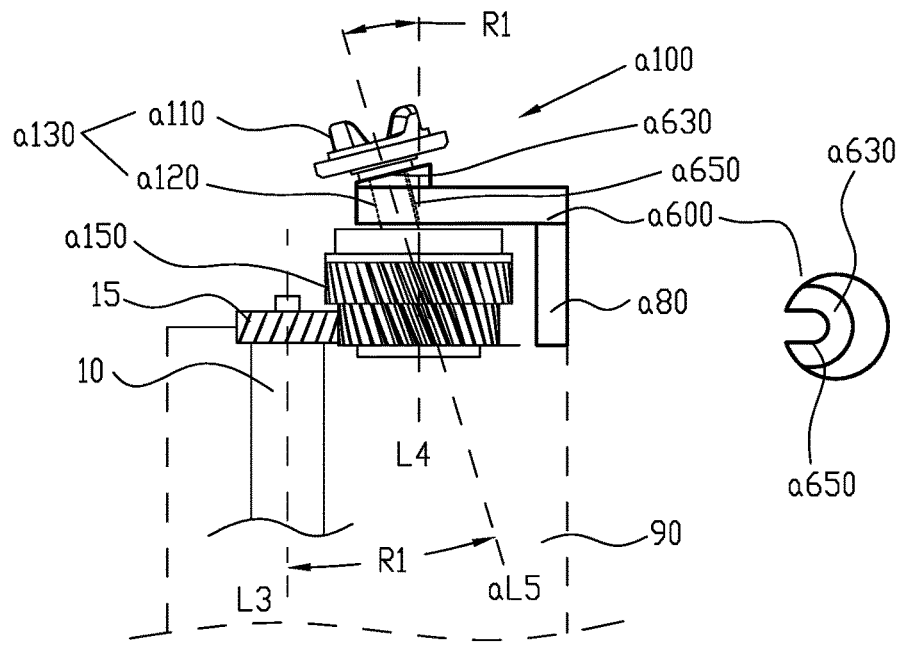
FIG. 29B illustrates a schematic diagram of another position-limiter portion causing the power receiving unit to tilt consistent with disclosed embodiments.

As shown in FIGS. 29A and 29B, the position-limiter a600 disposed on the processing cartridge C causes the power receiving unit a130 to tilt toward the developing unit 10, and the center line aL5 of the power receiving unit a130 may remain constantly inclined to the rotation axis L4 of the power transfer unit a150 or the rotation axis L3 of the developing unit 10. Because the power receiving unit a130 remains at an inclined state, the distances between each one of the engagement claws of the power receiving unit a130 and the power transfer unit a150 are different; that is, one engaging claw is closer to the transmitting unit a150 than the other engaging claw.

As shown in FIG. 29A, the position-limiter a600 is a tensile spring. One end of the position-limiter a600 is attached to the connecting member a120, and the other end of the position-limiter a600 is attached to a protrusion or projection a81 of the position-limiter a80 (e.g., referring to FIG. 26). The power receiving unit a130 remains inclined due to the elastic force of the tensile spring.

As shown in FIG. 29B, the position-limiter a600 may be a separate component disposed on the baffle a80, or the position-limiter a600 may also be a part of the baffle a80. The position-limiter a600 may include a blocking recess a650, and the blocking recess a650 abuts the connecting member a120 to cause the power receiving unit a130 to remain in an inclined state constantly. Further, additionally or optionally, the outer surface of the position-limiter a600 also has a slope a630. The slope a630 is able to abut the reverse side of the engaging portion a110, also causing the power receiving unit a130 to remain in an inclined state.

Figure 30:
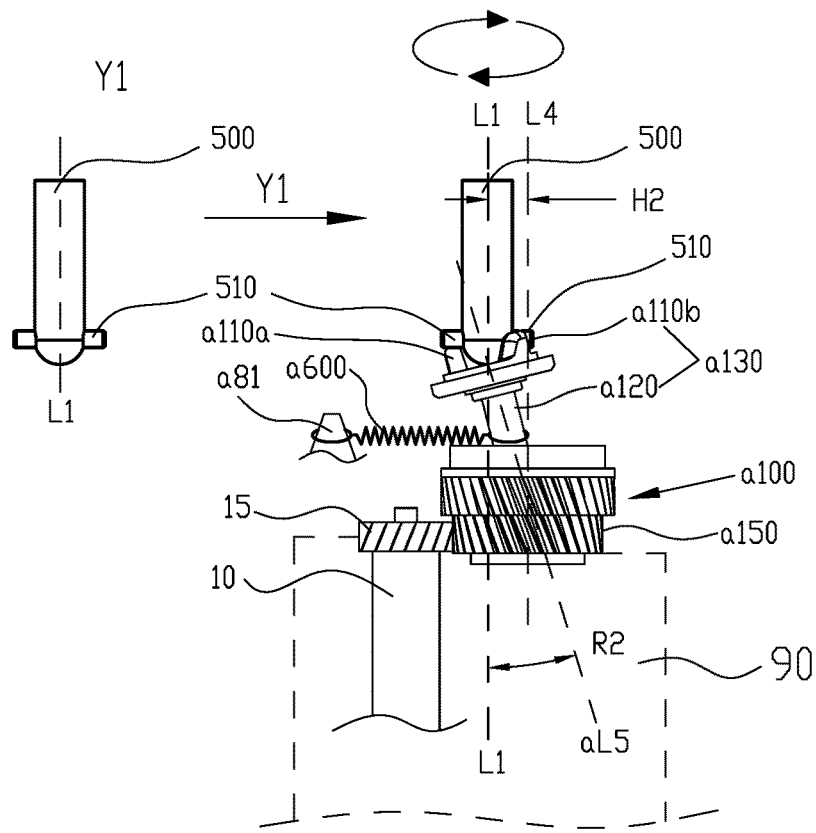
FIG. 30 illustrates a schematic diagram of an engagement process between the driving assembly power receiving unit and the driving mechanism consistent with disclosed embodiments.

As shown in FIG. 30, before the driving mechanism 500 engages with the driving assembly a100, the driving mechanism 500 moves in the longitudinal direction Y1. At the same time, under the effect of the position-limiter a600, the power receiving unit a130 remains in an inclined state constantly.

Because the power receiving unit a130 remains in an inclined state, the engagement claw a110a of the power receiving unit a130, which is closer to the power transfer unit a150, can substantially avoid structural interference with the driving pin 510 moving together with the driving mechanism 500. Thus, the drive mechanism 500 can more easily enter the center position of the power receiving unit a130.

When the driving mechanism 500 engages with the driving assembly a100 to transfer the driving force, even when the distances between each of the engagement claws (a110a, a110b) and the power transfer unit a150 are different, at least one driving pin 510 on the driving mechanism 500 can abut the engagement claw a110b further from the power transfer unit a150. As such, when the driving mechanism 500 engages with the driving assembly a100 and transfers the rotational driving force, the driving assembly a100 remains inclined due to the restriction of the position-limiter a600. That is, the center line aL5 of the power receiving unit a130 remains inclined to the rotational axis L1 of the driving mechanism 500, and an inclination angle R2 exists between the center line aL5 and the rotational axis L1.

Accordingly, because the power receiving unit a130 remains in the inclined state, when the driving assembly a100 engages with the driving mechanism 500 to transfer the driving force, the drive assembly a100 may not need to be coaxial with the axial direction (i.e., L1, L2/aL5) of the driving mechanism 500. In addition, because the connecting member a120 of the power receiving unit a130 also remains in the inclined state, when the driving assembly a100 engages with the driving mechanism 500 at the other end of the connecting member a120, the rotation center of the power transfer unit a150 is apart from the rotation center of the drive mechanism 500. That is, the rotation axis L4 of the power transfer unit a150 is apart from the rotation axis L1 of the driving mechanism 500 (i.e., there is a distance H2 in between), and the rotation axis L4 is substantially parallel to the rotation axis L1. If the power transfer unit a150 and the gear 15 are separated from each other due to the distance H2, an additional gear may be added between the power transfer unit a150 and the gear 15, or the size of the gear 15 may also be adjusted.

Figure 31:
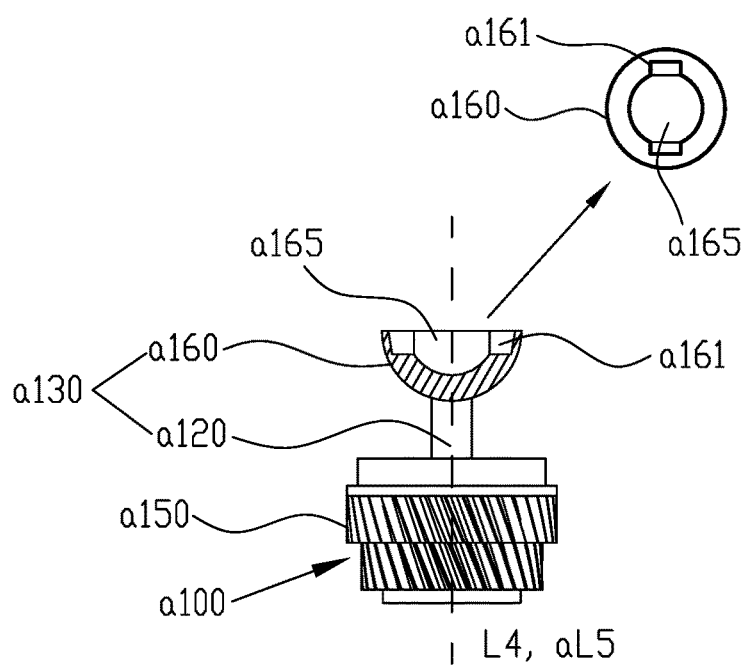
FIG. 31 illustrates a structural diagram of the semispherical member in the power receiving unit of the driving assembly consistent with disclosed embodiments.

Further, as shown in FIG. 31, to engage the driving assembly a100 with the driving mechanism 500 without occurrence of disengagement during the transfer of the driving force, the engaging portion a110 of the power receiving unit a130 may be replaced by a semisphere body 160 having an inner recess. The semisphere body 160 is disposed at one end of the connecting member a120 in the same manner as the engaging portion a110. The semisphere a160 has a concave opening a165, and the opening a165 has at least two blocking walls a161.

The concave opening a165 enclaves or fittingly wraps the circular arc projection a515 at the front side of the driving mechanism 500 (e.g., FIG. 32A), and the blocking wall a161 is disposed to abut the driving pin 510 of the driving mechanism 500 to receive the driving force. Likewise, the semisphere body a160 is restricted by the position-limiter a600, and the center line aL5 of the semisphere body a160 remains inclined with respect to the rotation axis L4 of the transmission unit a150 or the rotation axis L1 of the driving mechanism 500.

Figure 32A:
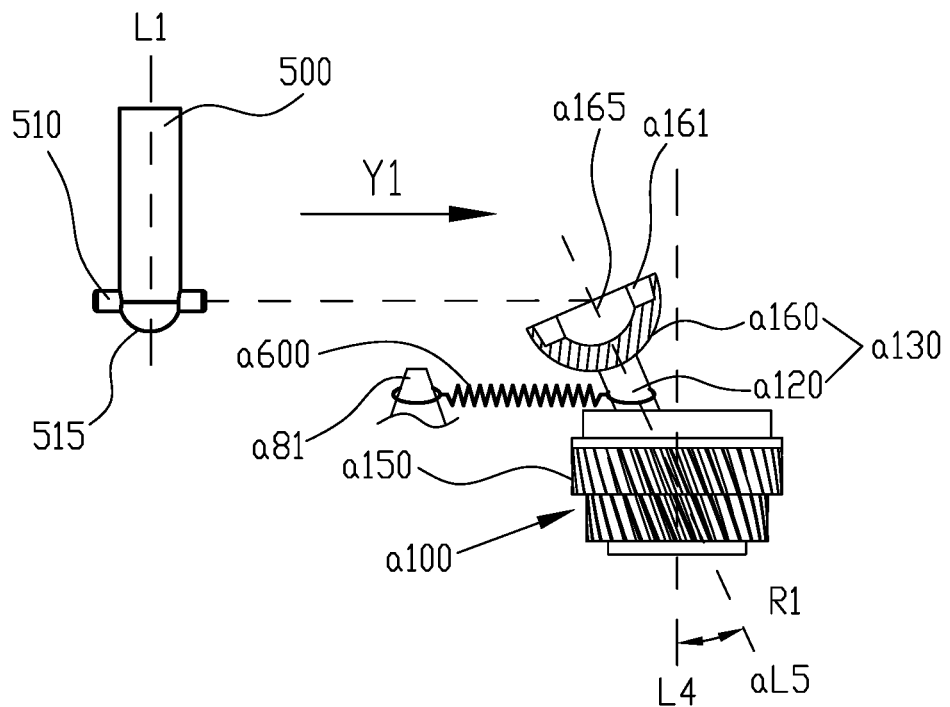
FIG. 32A illustrates a structural diagram of a position-limiter portion causing the power receiving unit to tilt consistent with disclosed embodiments.
Figure 32B:
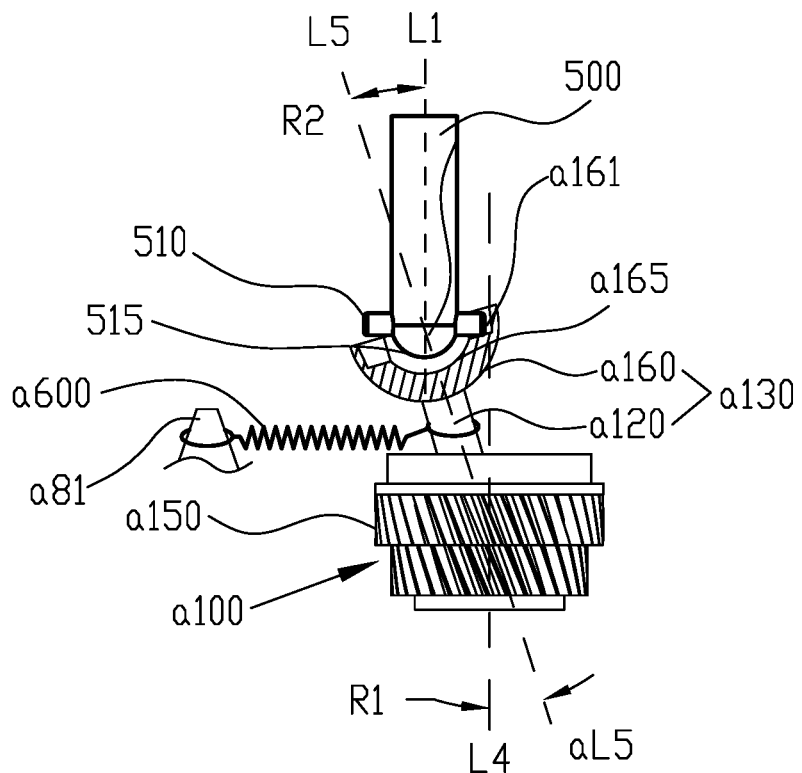
FIG. 32B illustrates is a schematic diagram of another engagement process between the power receiving unit of the driving assembly and the driving mechanism consistent with disclosed embodiments.

As shown in FIGS. 32A and 32B, the driving mechanism 500 moves along the longitudinal direction Y1 into the semisphere body 160 of the power receiving unit a130, and the driving pin 510 of the driving mechanism 500 transfers the driving force by abutting one blocking wall a160 on the semisphere body a160. Due to the shape configuration of the semisphere body a160, during the transfer of the driving force, the arc projection a515 of the driving mechanism 500 is enclaved by the semisphere 160, and the driving pin 510 also abuts the blocking wall 161 in the opening a165. Accordingly, when the driving mechanism 500 engages with the driving assembly a100 to transfer the driving force, the driving mechanism 500 and the power receiving unit a130 can largely avoid disengagement.

Figure 33A:
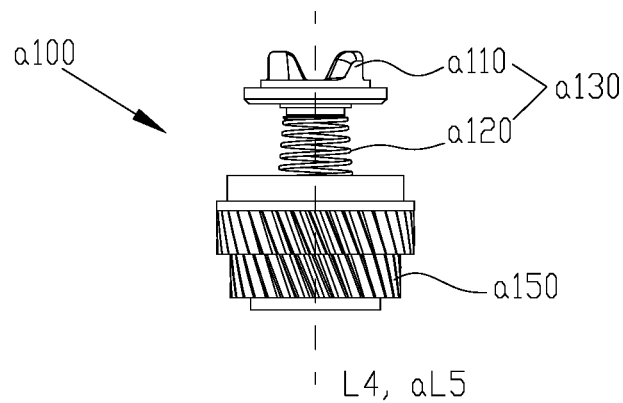
FIG. 33A illustrates a structural diagram of a connecting member (elastic member) of the driving assembly consistent with disclosed embodiments.
Figure 33B:
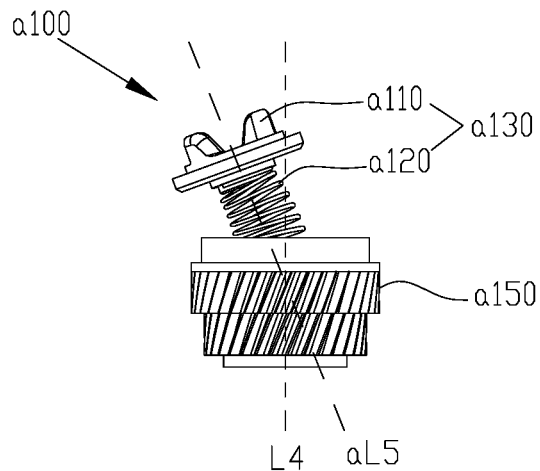
FIG. 33B illustrates a structural diagram of the connecting member (elastic member) of the driving assembly consistent with disclosed embodiments.

In certain embodiments, the connecting member a120 of the power receiving unit a130 may be a cylindrical rod, or an elastic member (i.e., a tensile spring) connecting the engaging portion a110 and the transmitting unit a150. As shown in FIGS. 33A and 33B, a150 by replacing the connecting rod with the elastic member, the transferring member a125 of the connecting member a120, and the cavity a155 and chutes a151 of the power transfer unit a150 may be omitted. A simple process, e.g., gluing, buckling, or riveting, may be used to connect the elastic member with the engaging portion a110 and the power transfer unit a150.

Figure 34:
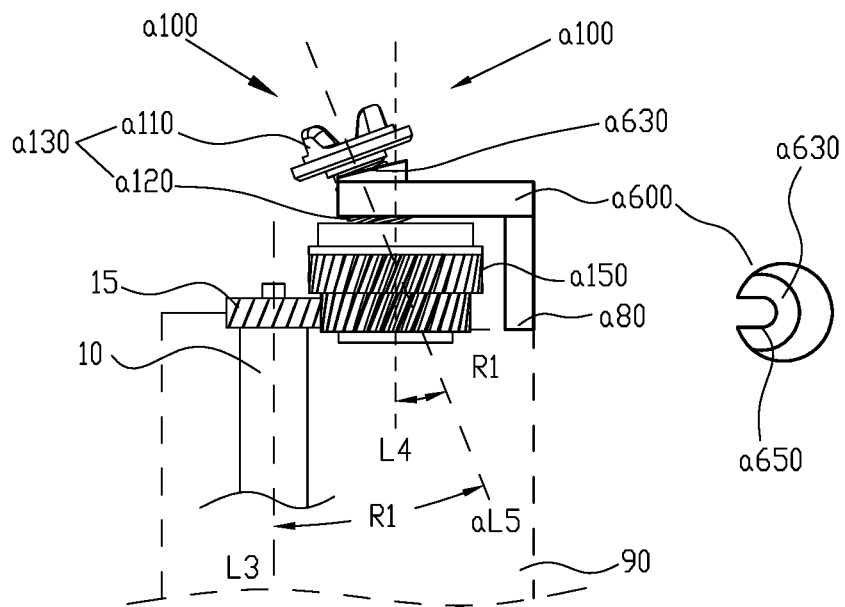
FIG. 34 illustrates a structural diagram of another position-limiter portion causing the power receiving unit to tilt consistent with disclosed embodiments.

As shown in FIG. 34, to maintain the inclination angle of the power receiving unit a130, because the connecting member a120 is an elastic member (e.g., a tensile spring), the position-limiter a600 may have a blocking recess a650 and may abut the connecting member a120 or the reverse side of the engaging member a110, causing the power receiving unit a130 to maintain the inclined state. That is, the center line aL5 of power receiving unit a130 constantly remains inclined with respect to the rotation axis L4 of the power transfer unit a150 or the rotation axis L3 of the developing unit 10. In certain embodiments, the engaging portion a110 of the power receiving unit a130 can also be replaced by the semisphere body 160 shown in FIG. 31.

Further, because the power receiving unit a130 remains inclined when engaging with the driving pin 510 of the driving mechanism 500, two or more engaging portions a110 on the power receiving unit a130 or two or more blocking walls a161 in the semisphere body a160 may be provided. Thus, the driving pin 510 can more easily abut the engaging portion a110 or the blocking wall a161 to transfer the driving force.

Embodiment Four

Figure 35:
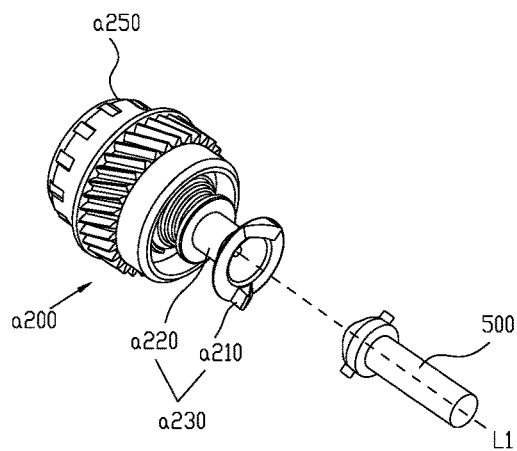
FIGS. 35 and 36 illustrate structural diagrams of another exemplary driving assembly consistent with disclosed embodiments.
Figure 36:
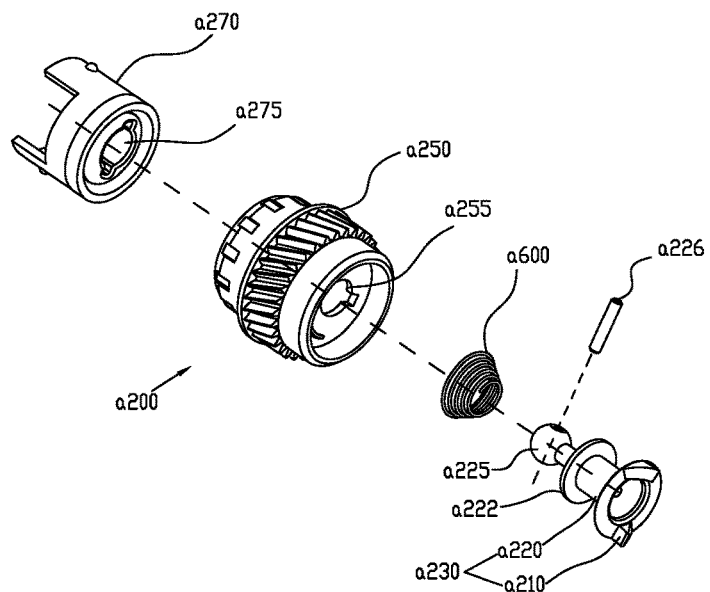

FIGS. 35 and 36 illustrate another exemplary driving assembly of the processing cartridge C. As shown in FIGS. 35 and 36, the driving assembly a200 includes a power receiving unit a230, a power transfer unit a250, a position-limiter a600, and a base a270. The position-limiter a600 may be a tensile spring and, in one embodiment, may be a conical tensile spring.

Figure 37A:
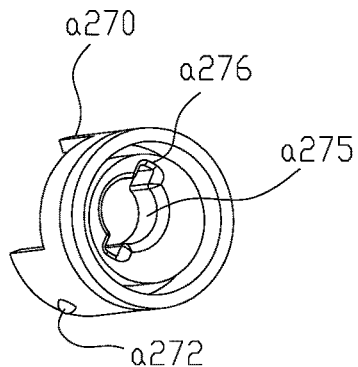
FIGS. 37A and 37B illustrates structural diagrams of a base portion consistent with disclosed embodiments.
Figure 37B:
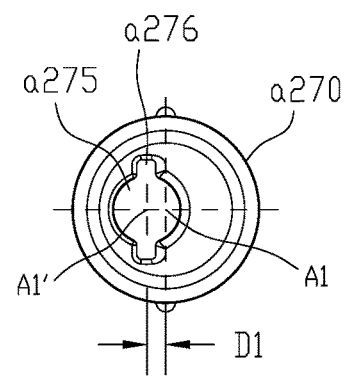

As shown in FIG. 37A, a base a270 is provided with a cavity a275 on one end; one or more chute a276 is provided on the side of the cavity a275; and a positioning protrusion a272 is provided on the cylindrical side-surface of the base a270. When viewed from the axial direction at one end of the cavity a270, as shown in FIG. 37B, the cavity a275 is located at an offset from the central axis of the base a270. That is, the center point A1' of the cavity a275 is at an offset from the rotation central axis A1 of the base a270, and a distance D1 exists between the center point A1' and the rotation central axis A1, which may be in a range of approximately 2 mm to 8 mm.

Figure 38A:
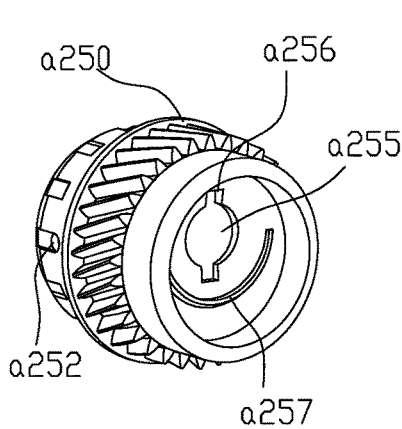
FIGS. 38A, 38B, and 38C illustrate structural diagrams of a power transfer unit consistent with disclosed embodiments.

As shown in FIG. 38A, an opening a255 and a blocking protrusion a257 are disposed on one end of the power transfer unit a250; a recess a256 is disposed next to the opening a255, and a positioning hole a252 is situated on the cylindrical surface of the power transfer unit a250.

Figure 38B:
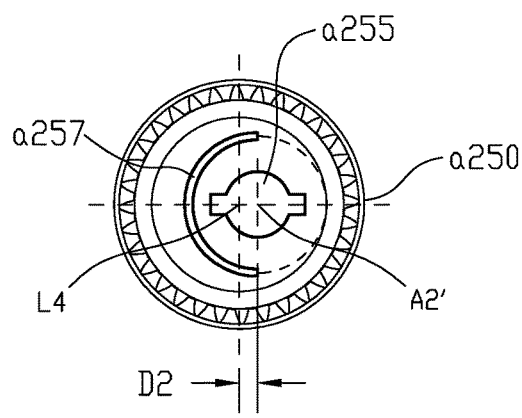

As shown in FIG. 38B, viewed from the axial direction at one end of the power transfer unit a250, the opening a255 is not centered on the central axis of the power transfer unit a250. That is, the center point A2' of the opening a255 is at an offset from the rotation central axis L4 of the power transfer unit a250. A distance D1 exists between the center point A2' and the rotation central axis L4 exists, and may be in a ranges from approximately 2 mm to 8 mm.

Figure 38C:
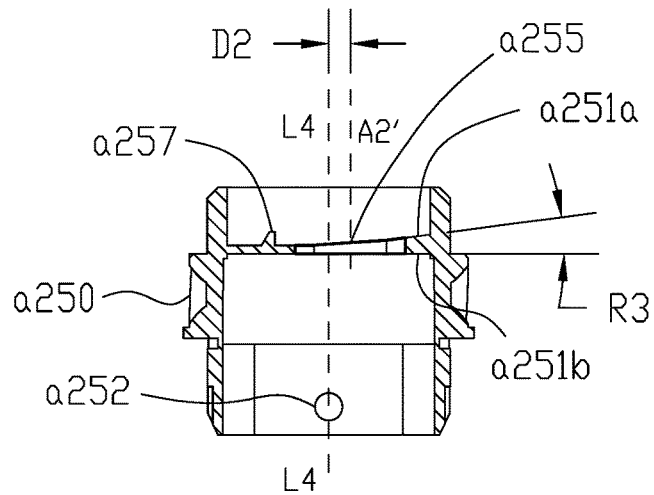

In addition, as shown in FIG. 38C, in the cross-sectional diagram of the power transfer unit a250, a part of the end surface a251a surrounding the opening a255 is inclined with respect to the reverse surface a251b of the power transfer unit a250. That is, an inclination angle R3 exists between the end surface a251a and the reverse surface a251b, which may be in a ranges from approximately 2 to 20 degrees.

Figure 39:
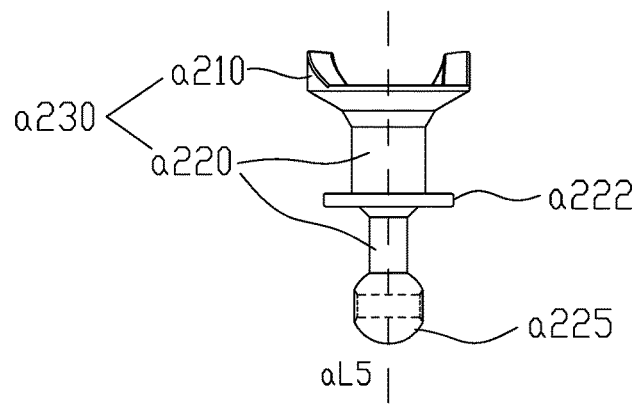
FIG. 39 illustrates a structural diagram of the power receiving unit consistent with disclosed embodiments.

As shown in FIG. 39, the power receiving unit a230 includes an engaging portion a210 and a connecting member a220. The connecting member a220 is connected to the engaging portion a210 at one end, and includes a sphere body a225 at the other end. The connecting member a220 may also include a blocking layer a222.

In certain embodiments, the various components may be assembled in certain ways. As shown in FIGS. 36 to 41, the sphere body a225 of the power receiving unit a230 passes through the position-limiter a600 and a transferring member a226 is assembled into the sphere body a225. The sphere body a225 and the transferring member a226 pass through the opening a255 and the recess a256 of the power transfer unit a250. The sphere body a225 at one end of the connecting member a220 is placed into the cavity a275, and the transferring member a226 is located in the chute a276.

At the same time, the base a270 is fixed on the power transfer unit a250, through the positioning protrusion a272 locked to the positioning hole a252. After these components are assembled, the connecting member a220 passes through the position-limiter a600, and the connecting member a220 is disposed between the end surface a251a and the blocking layer a222. Because the opening a255 is structurally deviated from the cavity a275, when coupling the power transfer unit a250 with the base a270, the center point A2' needs to be coaxially aligned with the center point A1'.

Figure 40A:
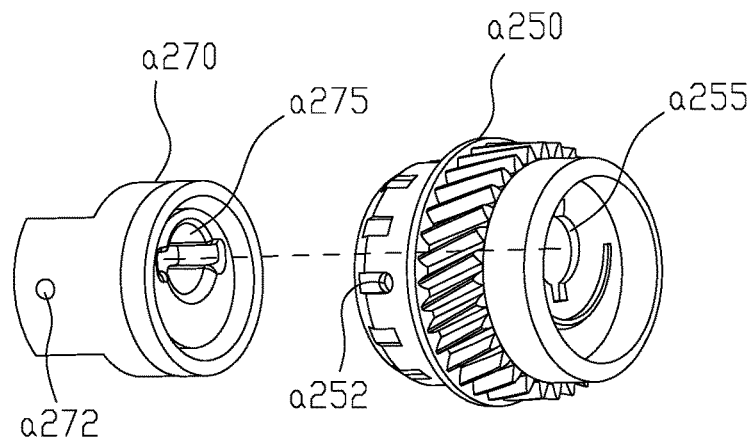
FIGS. 40A and 40B structural diagrams of a base coupling with the power transfer unit consistent with disclosed embodiments.
Figure 40B:
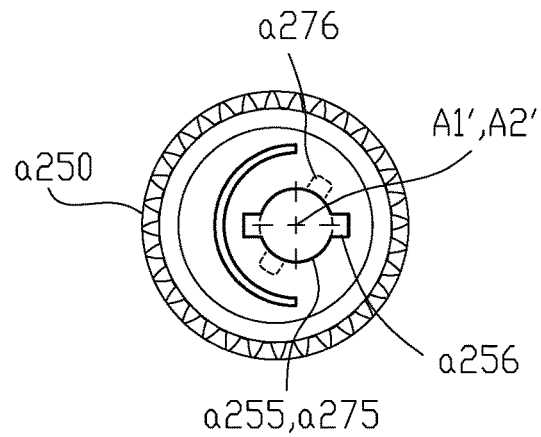

After coupling the power transfer unit a250 with the base a270, as shown in FIG. 40B, the opening a255 may substantially overlap with the cavity a275, while the recess a256 and the chute a276 may not substantially overlap or do not overlap. Accordingly, after the transferring member a226 of the sphere body a225 is placed into the chute a276, the transferring member a226 may be confined in the chute a276, so as to prevent power receiving unit a230 from disengaging from the power transfer unit a250.

Figure 41:
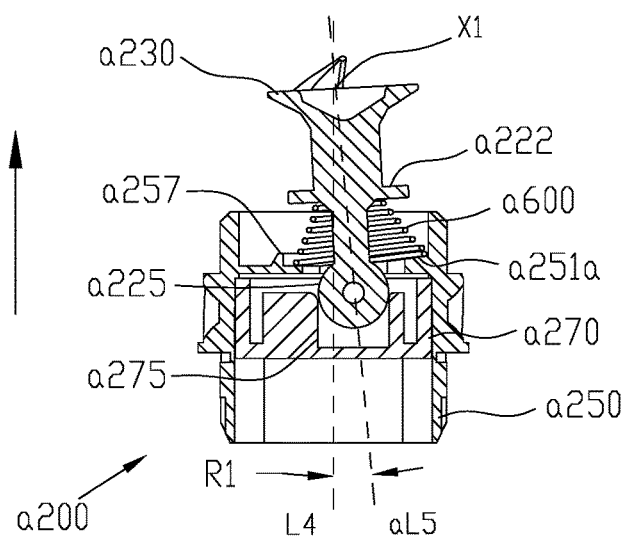
FIG. 41 illustrates a schematic diagram of a tilting power receiving unit consistent with disclosed embodiments.

As shown in FIG. 41, due to the inclined disposition of the end surface a251, the position-limiter a600 abutting the end surface a251a may also remain inclined. Under the force applied by the position-limiter a600 on the blocking layer a222, the power receiving unit a230 may also be tilted, and the center line aL5 of the power receiving unit a230 remains inclined with respect to the rotation axis L4 of the power transfer unit a250. In addition, the elastic property of the position-limiter a600 may cause the power receiving unit a230 to retreat inwardly when being compressed, and to extend outwardly when not being compressed. Further, a blocking or retaining projection a257 may be disposed on the end surface of the power transfer unit a250. The retaining projection a257 may prevent the position-limiter a600 from separating from the end surface a251a.

The engagement process of the driving assembly a200 with the driving mechanism 500 may be similar to those described above, for example, as shown in FIGS. 30, 32A and 34.

Figure 42A:
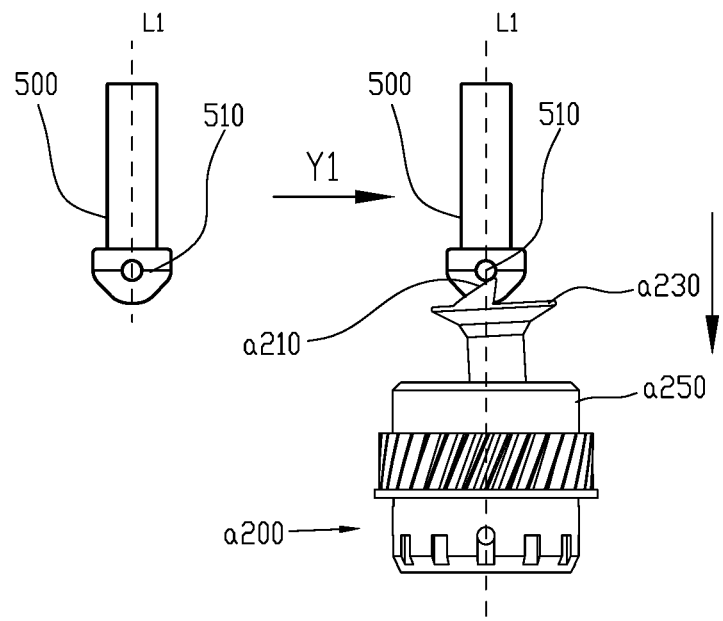
FIGS. 42A and 42B illustrate schematic diagrams of an engagement process between the power receiving unit of the driving assembly and the driving mechanism consistent with disclosed embodiments.
Figure 42B:
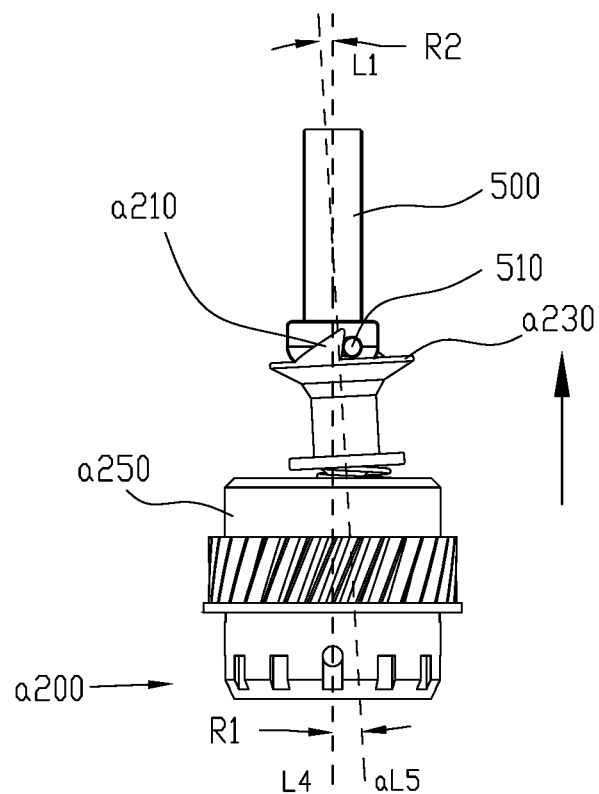

As shown from FIGS. 41, 41A, and 42B, and comparing with the third embodiment, by offsetting the cavity a275/the opening a255, the center line aL5 of the assembled power receiving unit 230 is at an offset position with respect to the rotation axis L4 of the power transfer unit a250. Further, by the disposition of the position-limiter a600 and the end surface a251a, the position-limiter a600 not only can cause the power receiving unit a230 to constantly remain inclined with respect to the power transfer unit a250, but also can cause the entire power receiving unit a230 to retreat inwardly relative to the power transfer unit a250 (FIG. 42A) when under pressure due to a certain probability that the engaging portion a210 structurally interferes with the driving pin 510.

When the driving mechanism 500 rotates, the rotating driving pin 510 can contact with the engagement claws in a staggered format. The engaging portion a210 is not under pressure, and the power receiving unit a230 receives an elastic force from the position-limiter a600 and extend outwardly. Finally, the engaging portion a210 contacts and engages the driving pin 510 to receive the rotational driving force (FIG. 42B). In addition, during the engagement of the driving mechanism with the driving assembly a200 for transferring the driving force, the center line aL5 remains constantly inclined with respect to the rotation axis L1 of the driving mechanism 500 or the rotation axis L4 of the power transfer unit a250.

Embodiment Five

Figure 43:
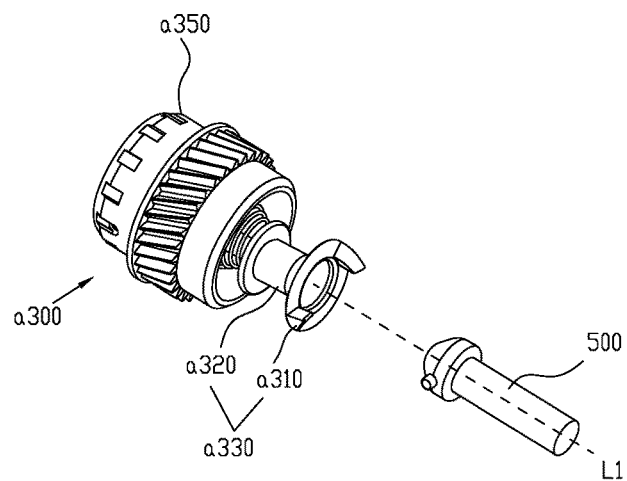
FIGS. 43 and 44 illustrate structural diagrams of another exemplary driving assembly consistent with disclosed embodiments.
Figure 44:
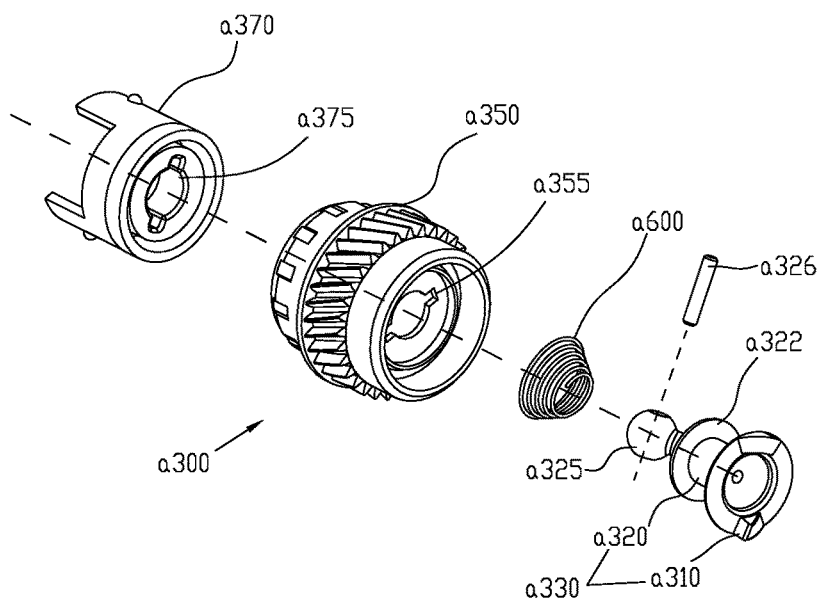

FIGS. 43 and 44 illustrate another exemplary driving assembly of the processing cartridge C. As shown in FIGS. 43 and 44, the driving assembly a300 includes a power receiving unit a330, a power transfer unit a350, a position-limiter a600, and a base a370. In certain embodiments, the position-limiter a600 is a tensile spring, and the tensile spring may be in a conical shape.

Figure 45A:
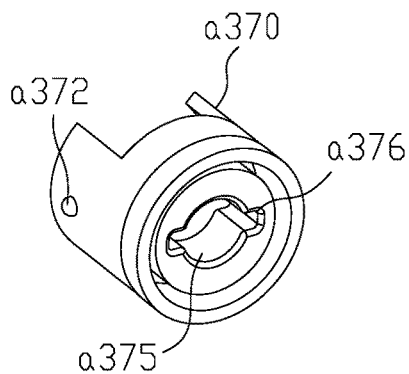
FIGS. 45A and 45B illustrate structural diagrams of a base portion consistent with disclosed embodiments.
Figure 45B:
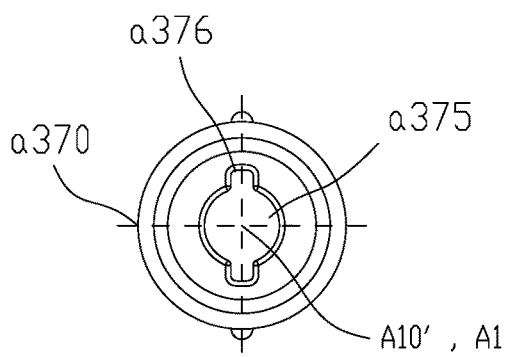

As shown in FIG. 45A, comparing with the fourth embodiment, the center point A10' of the cavity a375 on the end surface is substantially coaxial with the rotation center A1 of the base a370 (FIG. 45B); and the chute a376 and the positioning protrusion a372 may be disposed in similar ways as described in the fourth embodiment.

Figure 46A:
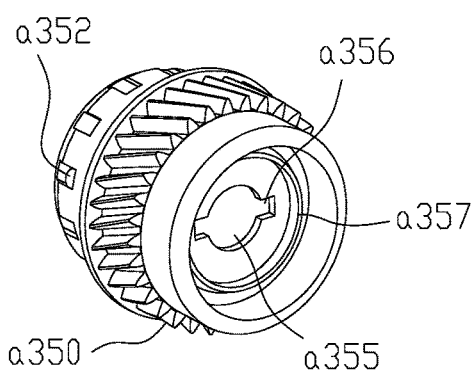
FIGS. 46A, 46B and 46C illustrate structural diagrams of an exemplary power transfer unit consistent with disclosed embodiments.
Figure 46B:
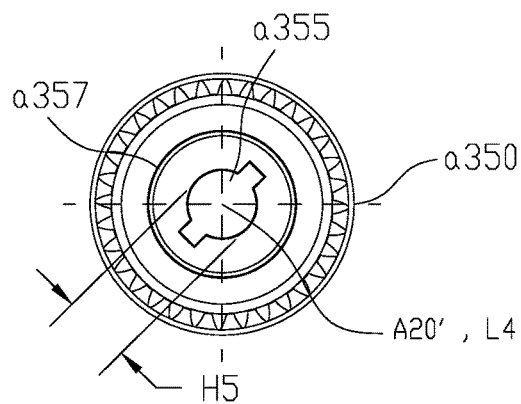
Figure 46C:
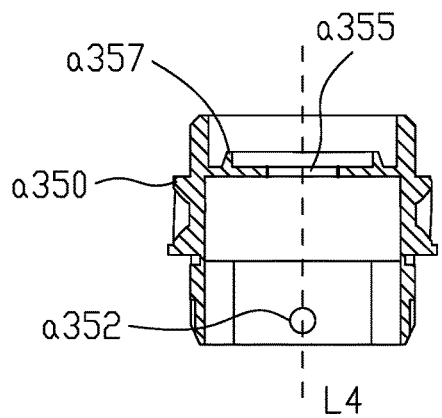

As shown in FIGS. 46B and 46C, comparing with the fourth embodiment, the center point A20' of the opening a355 on the end surface is substantially coaxial with the rotation axis L4 of the power transfer unit a350; and the recess a356, positioning hole a352 and blocking protrusion a357 may be disposed in similar ways as described in the fourth embodiment.

Figure 47A:
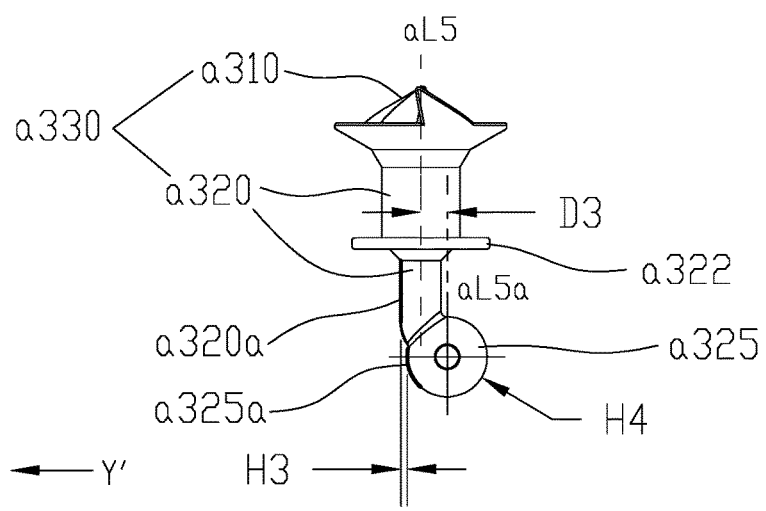
FIGS. 47A and 47B illustrate structural diagrams of a power receiving unit consistent with disclosed embodiments.
Figure 47B:
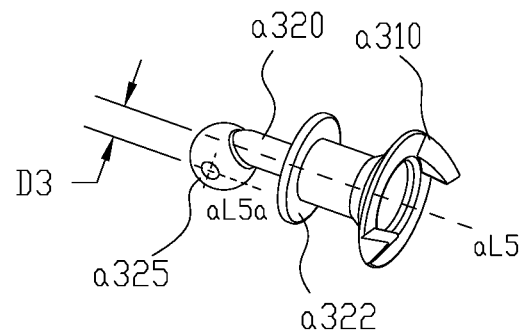

As shown in FIGS. 47A and 47B, the power receiving unit a330 includes an engaging portion a310 and a connecting member a320. The connecting member a320 is connected to the engaging portion a310 at one end and is provided with a sphere a325 at the other end. The connecting member may also be disposed with a blocking layer a322.

In addition, when viewed along a side direction of the power receiving unit a330, the center line aL5 of the power receiving unit a330 is deviated from the center line aL5a of the sphere a325 on one end of the connecting member a320, and a distance D3 exists between the center line aL5 and the center line aL5a, which may be in a ranges of approximately 2 mm to 8 mm. Furthermore, one side a320a of the connecting member a320 is outwardly higher (i.e., along the Y' axis) than one side a325b of the sphere a325, and a distance H3 exists between the side a320a and the side a325a.

In addition, as shown in FIGS. 46B and 47B, the diameter H5 of the opening a355 is larger than or equal to the diameter H4 of the sphere a325, the diameter H4 of the sphere a325 plus the total length of the distance H3 is larger than the diameter H5 of the opening a355, and the diameter H5 of the opening a355 is substantially equal to the diameter of the cavity a375.

In certain embodiments, the various components may be assembled in certain ways. As shown from FIGS. 44 to 50, the sphere a325 of the power receiving unit a330 passes through the position-limiter a600, and the transferring member a326 is assembled into the sphere a325. The sphere a325 and the transferring member a326 pass through the opening a355 and the recess a356 of the power transfer unit a350. The sphere a325 at one end of the connecting member a320 is placed into the cavity a375, and the transferring member a326 is located in the chute a376.

Figure 48A:
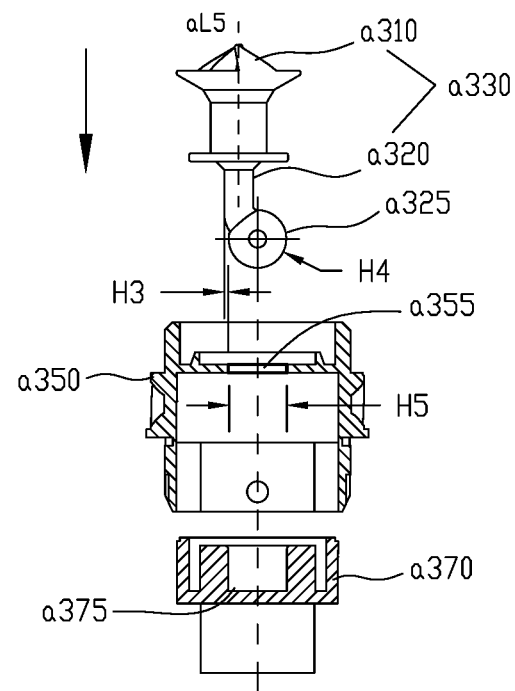
FIGS. 48A and 48B illustrate schematic diagrams of another exemplary drive unit consistent with disclosed embodiments.

At the same time, through the positioning protrusion a372 inserted into the positioning hole a352 of the power transfer unit a350, the base a370 is fixed on the power transfer unit a350. After these components are assembled, the position-limiter a600 is passed through by the connecting member a320, and is situated between the transferring surface a350 and the blocking layer a322. Because the diameter H5 of the opening a355 is greater than or equal to the diameter H4 of the sphere a325, the sphere a325 can smoothly passes through the opening a355 and can be assembled inside the cavity a375 (FIG. 48A).

Figure 48B:
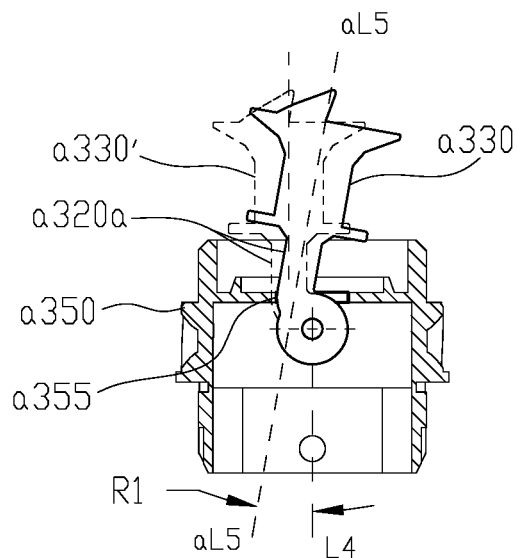
Figure 49:
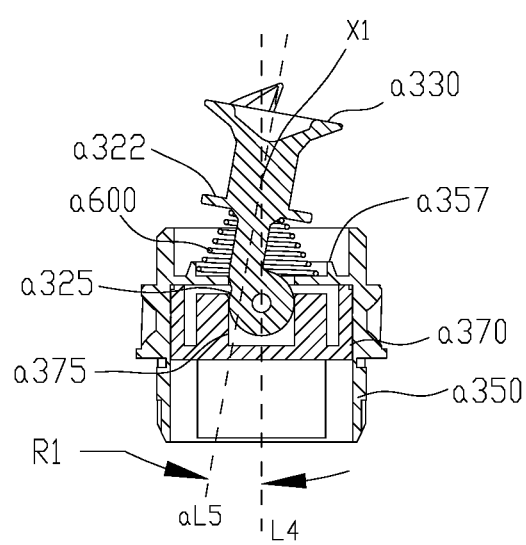
FIG. 49 illustrates a schematic diagram of a tilting power receiving unit consistent with disclosed embodiments.

However, because the diameter H5 of the opening a355 is smaller than the total length of the diameter H4 of the sphere a325 plus the distance H3, after the above components are assembled, the side a320a is restricted by the diameter size of the opening a355, causing the power receiving unit a330 to remain inclined with respect to the power transfer unit a350. That is, the center line aL5 of the power receiving unit a330 is inclined with respect to the rotation axis L4 of the power transfer unit a350 (FIG. 48B).

Finally, under the force of the position-limiter a600 on the blocking layer a322, the power receiving unit a330 remains at a predetermined inclination angle. When the side a320a abuts the opening a355, the power receiving unit a330 reaches a minimum inclination angle with respect to the power transfer unit a350.

Figure 50:
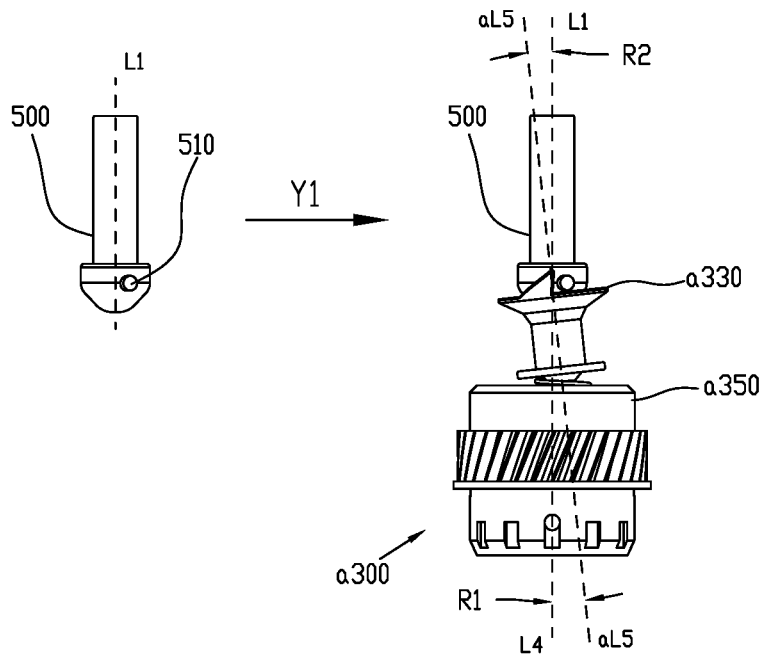
FIG. 50 illustrates a schematic diagram of an engagement process between the power receiving unit of the driving assembly and the driving mechanism consistent with disclosed embodiments.

In addition, as shown in FIG. 50, during the engagement process of the driving assembly a200 with the driving mechanism 500, the power receiving unit a330 may retreat or extend with respect to the power transfer unit a350, as similarly described in the fourth embodiment.

Embodiment Six

Those structures similar to the above embodiments, such as the power transfer unit of the driving assembly, position-limiter, and base, may be referred to those embodiments (e.g., the power transfer unit a350, the position-limiter a600, and the base a370 in the fifth embodiment) and not described herein in detail, while differences from other embodiments may be further illustrated.

Figure 51A:
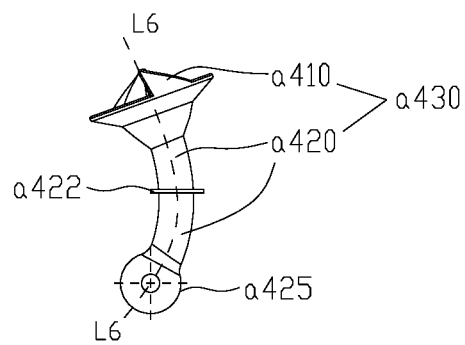
FIGS. 51A and 51B illustrate structural diagrams of another exemplary power receiving unit consistent with disclosed embodiments.
Figure 51B:
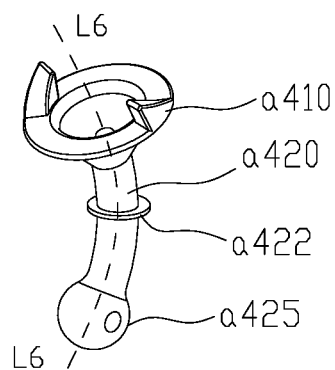

As shown in FIGS. 51A and 51B, a power receiving unit a430 includes an engaging portion a410 and a connecting member a420. The connecting member a420 is connected to the engaging portion a410 at one end and is disposed with a sphere a325 at the other end, and a baffle a422 may also be disposed on the connecting member a420. Further, when viewed from a side direction of the power receiving unit a430, the power receiving unit a430 is an arc-shaped structure, and the center line L6 of the power receiving unit a430 is not a straight line, rather having a certain degree of curving or arc.

Figure 52:
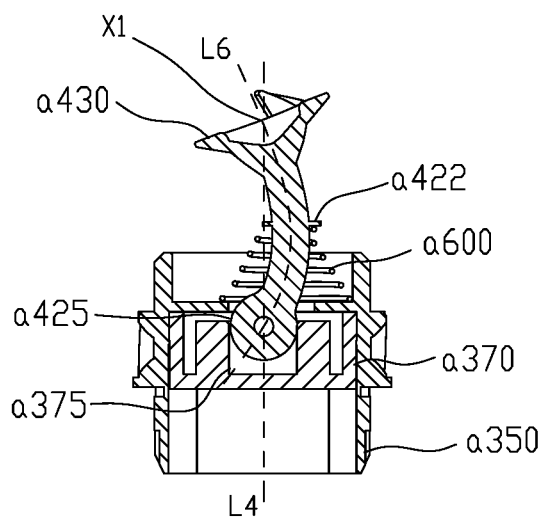
FIG. 52 illustrates a structural diagram of another exemplary power receiving unit consistent with disclosed embodiments.
Figure 53:
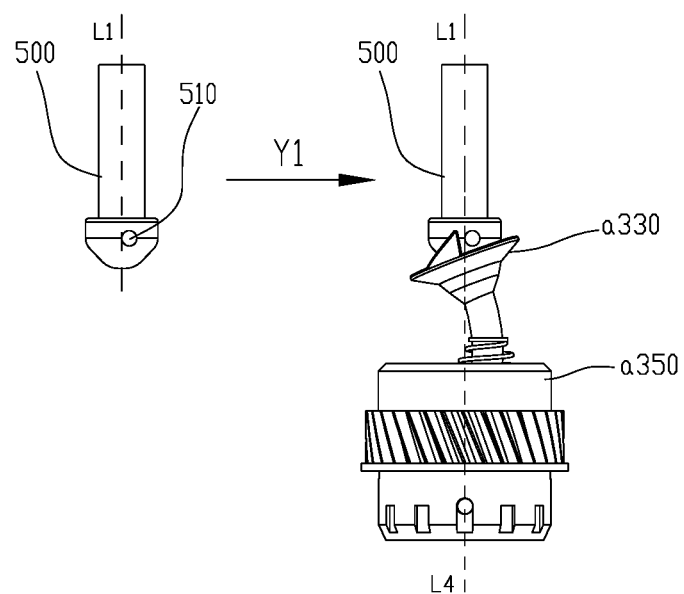
FIG. 53 illustrates a schematic diagram of an engagement process between the power receiving unit of the driving assembly and the driving mechanism consistent with disclosed embodiments.

As shown in FIGS. 52 and 53, after various components of the power receiving unit a430 are assembled, the arc-shaped power receiving unit a430 can achieve the same effect through the inclination angle between the power receiving unit (a130/a230/a330) and the power transfer unit (a150/a250/a350) as illustrated in the third, fourth, and fifth embodiments, such that the driving mechanism 500 can be easily entered into the center of the power receiving unit a430 and the rotating driving pin 510 can abut the engaging portion a410 to transfer the driving force.

Referring to FIGS. 28, 41, 49, and 52, with the driving assembly a100 in the third embodiment, the structural dispositions and installations of the power receiving unit (i.e., a230/a330/a430) in the fourth, fifth and six embodiments are different from the structural disposition and installation of the power receiving unit a330 in the third embodiment. The axis or center line (i.e., aL5/L6) of the power receiving unit (i.e., a230/a330/a430) and the rotation axis L4 of the power transfer unit (i.e., a250/a350) intersect at a point X1 outside the end surface of the power transfer unit (i.e., a250/a350). The center line (aL5) of the power receiving unit (i.e., a230/a330) is inclined with respect to the rotation axis L4 of the power transfer unit (i.e., a250/a350). However, the center axis aL5 of the power receiving unit a130 and the rotation axis L4 of the power transfer a150 may intersect at a point X2 inside the power transfer unit a150 in the third embodiment.

Further, with respect to the driving assembly a100 in the third embodiment, the structural disposition of the position-limiter a600 in the fourth, fifth, and sixth embodiments are different. In the third embodiment, the position-limiter a600 is situated in the power receiving unit a130 at one end and in the baffle a80 or the housing of the processing cartridge C at the other end; while in the fourth, fifth and sixth embodiments, the position-limiter a600 can be disposed in the driving assembly a200/a300. This way, the operation can be facilitated, the operation length can be shortened, and the procedures can be reduced.

Further, referring to FIG. 32A, after the transfer of the driving force, the driving assembly a100/a200/a300 and the driving mechanism 500 may detach from each other, and the drive mechanism 500 moves in the opposite direction to the longitude direction Y1. Because the power receiving unit a130/a230/a330 of the driving assembly a100/a200/a300 remain in the inclined state with respect to the power transfer unit a150/a250/a350, the driving mechanism 500 can easily detach from the power receiving unit a130/a230/a330, and the driving pin 510 of the driving mechanism 500 does not substantially interfere with engaging portion a110/a210/a310 or the blocking wall a161 (similarly with the arc-shaped power receiving unit a430).

By using the disclosed structures and methods, before the power receiving unit of the driving assembly engages the driving mechanism in the electronic imaging device or after the power receiving unit of the driving assembly engages the driving mechanism in the electronic imaging device to transfer the driving force, the power receiving unit of the driving assembly remains constantly inclined with respect to the power transfer unit, the driving mechanism, or the developing unit of the driving assembly. Thus, the present invention not only overcomes the structural interference occurred in the engagement or disengagement of the driving assembly with the driving mechanism, but also maintains structural strength even after multiple engagement and disengagement, avoiding the structural tear or breaking and improving the service life of the processing cartridge or the electronic imaging device.

It should be noted that the above embodiments are merely provided for describing the technical solutions of the present invention, and not intended to limit the scope thereof. Although detailed descriptions are provided regarding the various embodiments, those skilled in the art can appreciate that the disclosed technical solutions can be modified, or some or all of the technical features can be equivalently replaced without inventive efforts. Such modifications or replacements will be readily apparent to those skilled in the art, and do not depart from the spirit or scope of the invention.

What is claimed is:

1. A driving assembly of a processing cartridge capable of being detachably installed in an electronic imaging device, comprising:
   a power receiving unit for receiving a rotational driving force from a driving mechanism of the electronic imaging device; and
   a power transfer unit coupled to the power receiving unit for receiving the rotational driving force from the power receiving unit,
   wherein:
   the power receiving unit remains constantly inclined with respect to a rotation axis of the power transfer unit, and has an initial position and a displaced position;
   the power receiving unit moves from the initial position to the displaced position when an external force is applied;
   the power receiving unit returns to the initial position from the displaced position when the external force is withdrawn; an inclination angle between the power receiving unit and the rotation axis of the power transfer unit remains the same when the power receiving unit is in the initial position and in the displace position
   the power receiving unit includes an engaging portion; and
   a first position of the engaging portion when the power receiving unit is in the initial position is ahead of a second position of the engaging potion when the power receiving unit is in the displaced position along an installation direction for installing the processing cartridge into the electronic imaging device.

2. The driving assembly according to claim 1, wherein:
   the installation direction is approximately perpendicular to an axial direction of the power transfer unit.

3. The driving assembly according to claim 1, further including:
   a position-limiter portion for controlling the power receiving unit to move between the initial position and the displaced position,
   wherein the position-limiter portion causes the power receiving unit to maintain a same inclination angle with respect to the power transfer unit when the power receiving unit is in the initial position and in the displaced position.

4. The driving assembly according to claim 3, wherein:
   the power receiving unit includes a connecting member; and
   the connecting member is connected to the position-limiter portion.

5. The driving assembly according to claim 4, wherein:
   the position-limiter portion includes an arc-shaped chute;
   the chute is disposed around the rotation axis of the power transfer unit;
   the connecting member is disposed in the chute and slides along the chute; and
   a width of the chute is substantially the same as a diameter of the connecting member.

6. The driving assembly according to claim 5, wherein:
   the position-limiter portion includes a position-limiter;
   viewed along the rotation axis of the power transfer unit from top of the position-limiter portion, the position-limiter overlaps with the rotation axis of the power transfer unit; and
   a side of the position-limiter forms an inner side surface of the arc-shaped chute.

7. The driving assembly according to claim 6, further including:
   a baffle containing an opening,
   wherein the power receiving unit passes through the opening, the position-limiter extends from one side of the opening to a center of the opening to form the arc-shaped chute.

8. The driving assembly according to claim 7, further including:
   a reset member, wherein:
   one end of the reset member is connected to the baffle and the other end of the reset member is connected to the power receiving unit; and
   when the external force is withdrawn, the reset member causes the power receiving unit to return to the initial position from the displaced position.

9. The driving assembly according to claim 6, further including:
   a reset member, wherein:
   one end of the reset member is fixed;
   the other end of the reset member is connected to the power receiving unit; and
   when the external force is withdrawn, the reset member causes the power receiving unit to return to the initial position from the displaced position.

10. The driving assembly according to claim 9, wherein:
    the reset member generates an elastic tensile force, and includes one of a rubber band and a tensile spring.

11. The driving assembly according to claim 4, wherein:
the position-limiter portion is rotatable around the rotation axis of the power transfer unit;
the power receiving unit rotates together with the position-limiter portion after the connecting member engages with the position-limiter portion; and
the power receiving unit independently rotates around the rotation axis of the power receiving unit.

12. The driving assembly according to claim 11, wherein:
the position-limiter portion has an opening eccentrically situated to a rotation axis of the power transfer unit;
the connecting member passes through the opening; and
a diameter of the opening is substantially the same as a diameter of the connecting member.

13. The driving assembly according to claim 12, further including:
a baffle having an opening, wherein the power receiving unit passes through the opening of the baffle, and the position-limiter portion covers the opening of the baffle.

14. The driving assembly according to claim 1, further including:
a buffer member disposed between the power receiving unit and the power transfer unit for causing the power receiving unit to extend and retreat with respect to the power transfer unit.

15. The driving assembly according to claim 1, wherein:
the engaging portion is a semispherical member including an inner recess; and
the inner recess is provided with at least two blocking walls.

16. The driving assembly according to claim 1, wherein:
the power transfer unit includes a cavity in which a chute is situated in the axial direction of a rotation axis of the power transfer unit;
the power receiving unit includes a transferring member;
the power receiving unit extends into the cavity; and
the transferring member is placed in the chute and slides along the chute.

17. A processing cartridge capable of being detachably installed in an electronic imaging device, comprising:
a developing unit; and
a driving assembly including a power receiving unit for receiving a rotational driving force from a driving mechanism of the electronic imaging device, and a power transfer unit coupled to the power receiving unit for receiving the rotational driving force from the power receiving unit,
wherein:
the power receiving unit remains constantly inclined with respect to a rotation axis of the power transfer unit, and has an initial position and a displaced position;
the power receiving unit moves from the initial position to the displaced position when an external force is applied;
the power receiving unit returns to the initial position from the displaced position when the external force is withdrawn; an inclination angle between the power receiving unit and the rotation axis of the power transfer unit remains the same when the power receiving unit is in the initial position and in the displace position and
the power receiving unit has an engaging portion; and
a first position of the engaging portion when the power receiving unit is in the initial position is ahead of a second position of the engaging portion when the power receiving unit is in the displaced position along an installation direction for installing the processing cartridge into the electronic imaging device.

18. The processing cartridge according to claim 17, wherein:
the power receiving unit is inclined with respect to the developing unit; and
a rotation axis of the power receiving unit is inclined with respect to a rotation axis of the developing unit.

* * * * *

UNITED STATES PATENT AND TRADEMARK OFFICE
CERTIFICATE OF CORRECTION

PATENT NO. : 9,846,409 B2  
APPLICATION NO. : 15/342916  
DATED : December 19, 2017  
INVENTOR(S) : Jianxin Cao, Haidong Hua and Qijie Liang Page 1 of 1

It is certified that error appears in the above-identified patent and that said Letters Patent is hereby corrected as shown below:

On the Title Page

(73) Assignee should read: NINESTAR CORPORATION Zhuhai (CN)

Signed and Sealed this  
Tenth Day of April, 2018

Andrei Iancu  
*Director of the United States Patent and Trademark Office*